(12) United States Patent
Espinosa

(10) Patent No.: US 12,345,289 B2
(45) Date of Patent: Jul. 1, 2025

(54) COUPLER FOR CONNECTING A REBAR TO A THREADED ROD OR ANOTHER REBAR

(71) Applicant: CETRES HOLDINGS, LLC, Jackson, WY (US)

(72) Inventor: Thomas M. Espinosa, Snohomish, WA (US)

(73) Assignee: CETERES HOLDINGS, LLC, Jackson, WY (US)

( * ) Notice: Subject to any disclaimer, the term of this patent is extended or adjusted under 35 U.S.C. 154(b) by 169 days.

(21) Appl. No.: 16/895,632

(22) Filed: Jun. 8, 2020

(65) Prior Publication Data

US 2021/0025419 A1    Jan. 28, 2021

Related U.S. Application Data

(60) Provisional application No. 62/878,329, filed on Jul. 24, 2019.

(51) Int. Cl.
*F16B 7/18* (2006.01)
*E04H 9/02* (2006.01)
*E04H 9/14* (2006.01)

(52) U.S. Cl.
CPC ............ *F16B 7/182* (2013.01); *E04H 9/14* (2013.01); *E04H 9/027* (2013.01); *Y02A 50/00* (2018.01)

(58) Field of Classification Search
CPC .......... F16B 7/182; E04H 9/027; E04H 9/14; Y02A 50/00
See application file for complete search history.

(56) References Cited

U.S. PATENT DOCUMENTS

| | | | |
|---|---|---|---|
| 461,562 A * | 10/1891 | Ball | F16B 7/182 191/44.1 |
| 1,656,797 A * | 1/1928 | Scott | H01R 4/56 403/301 |
| 3,456,092 A * | 7/1969 | Rush | B23K 15/0073 219/121.14 |
| 3,791,751 A * | 2/1974 | Vey | F16C 3/00 403/311 |
| 3,969,032 A | 7/1976 | Wolicki | |
| 4,010,629 A * | 3/1977 | Wolicki | B23K 9/0026 72/368 |
| D422,200 S * | 4/2000 | Maruyama | D8/382 |
| 6,951,078 B2 | 10/2005 | Espinosa | |
| D583,224 S * | 12/2008 | Holdsworth | D8/382 |
| 7,762,030 B2 | 7/2010 | Espinosa | |
| 8,136,318 B2 | 3/2012 | Espinosa | |
| 8,943,777 B2 | 2/2015 | Espinosa | |

(Continued)

FOREIGN PATENT DOCUMENTS

JP    3879065    2/2007

*Primary Examiner* — Omar F Hijaz
(74) *Attorney, Agent, or Firm* — FRESH IP PLC

(57) ABSTRACT

A coupler includes a cylindrical body having a first end and a second end; the cylindrical body including an axial hole extending from the first end to the second end with a side wall, the axial hole including a first portion for receiving an end portion of a first rod and a threaded second portion for receiving an end portion of a second rod; and the cylindrical body including a first longitudinal cutout extending into the side wall to create a first opening into the first portion of the axial hole to expose the end portion of the first rod to be welded to the cylindrical body.

24 Claims, 23 Drawing Sheets

(56) References Cited

U.S. PATENT DOCUMENTS

| | | |
|---|---|---|
| 9,097,000 B2 | 8/2015 | Espinosa |
| 9,097,001 B2 | 8/2015 | Espinosa |
| 9,416,530 B2 | 8/2016 | Espinosa |
| 9,874,009 B2 | 1/2018 | Espinosa |
| D813,023 S * | 3/2018 | Reigstad .................. D8/382 |
| 2003/0159395 A1* | 8/2003 | Dahl .................. E04C 5/165 |
| | | 52/223.13 |
| 2019/0211559 A1* | 7/2019 | Allington ................ E04C 5/165 |

* cited by examiner

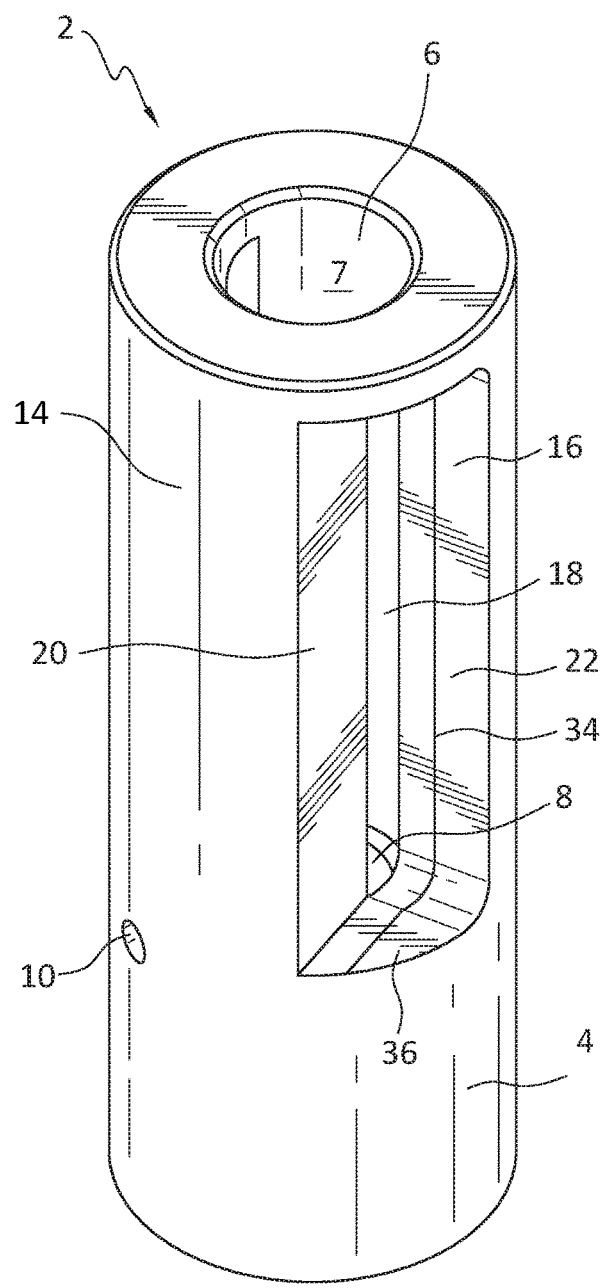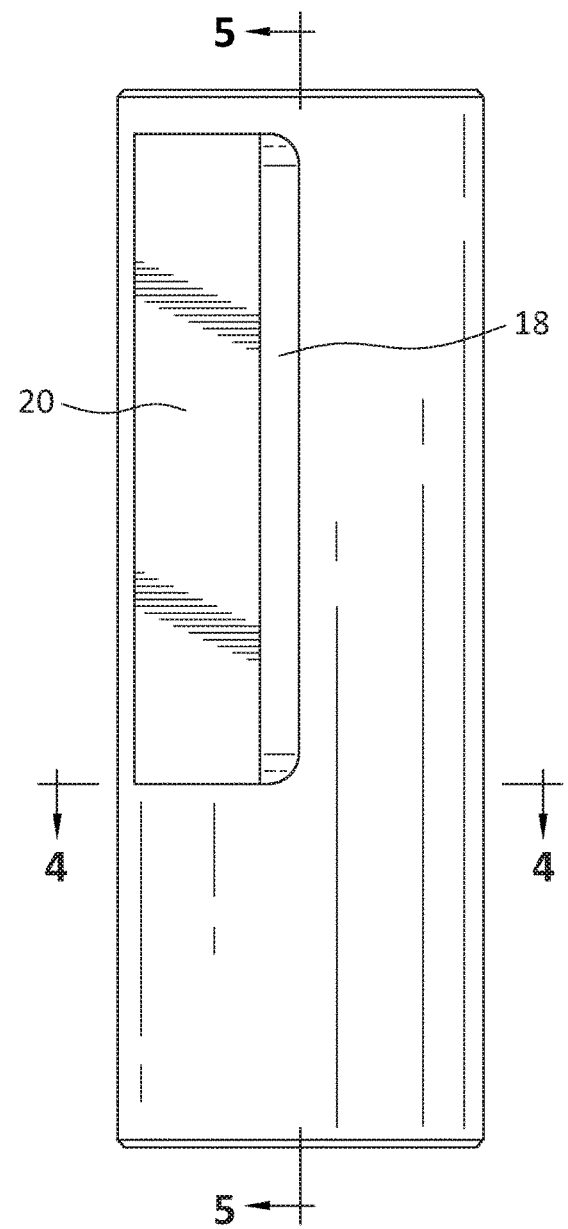
FIG. 1
FIG. 2

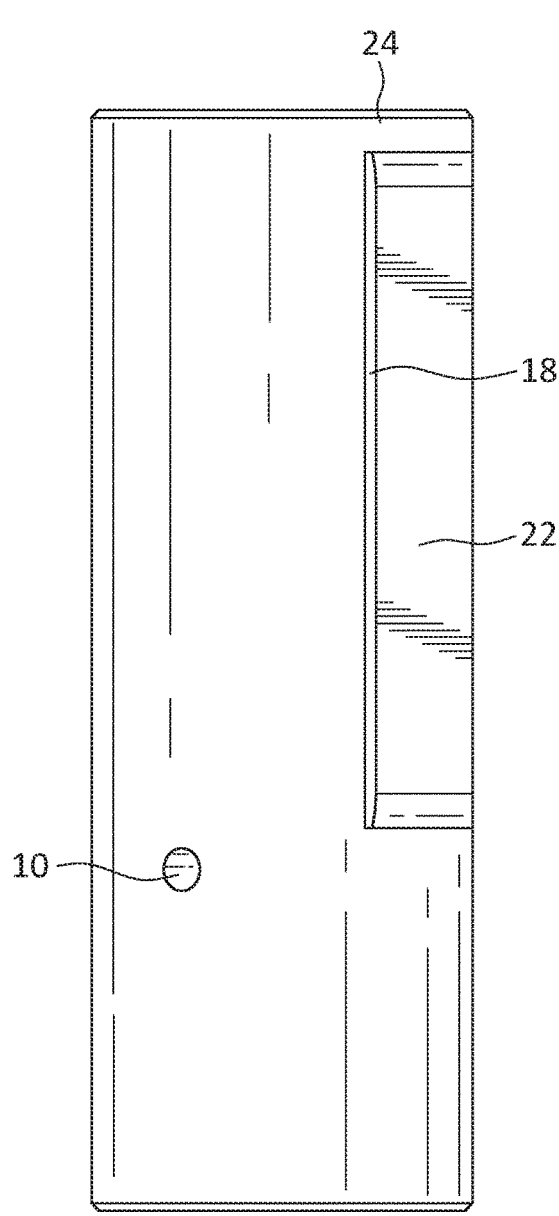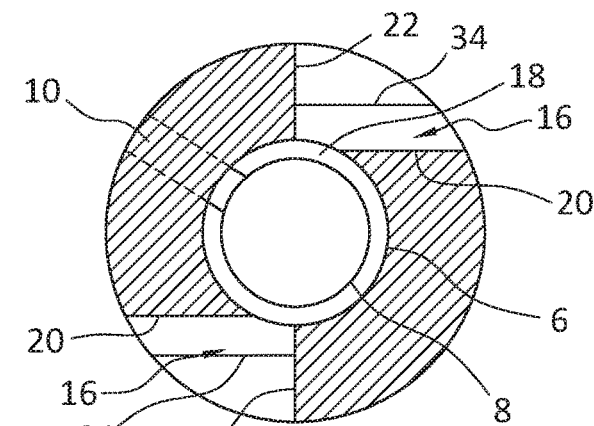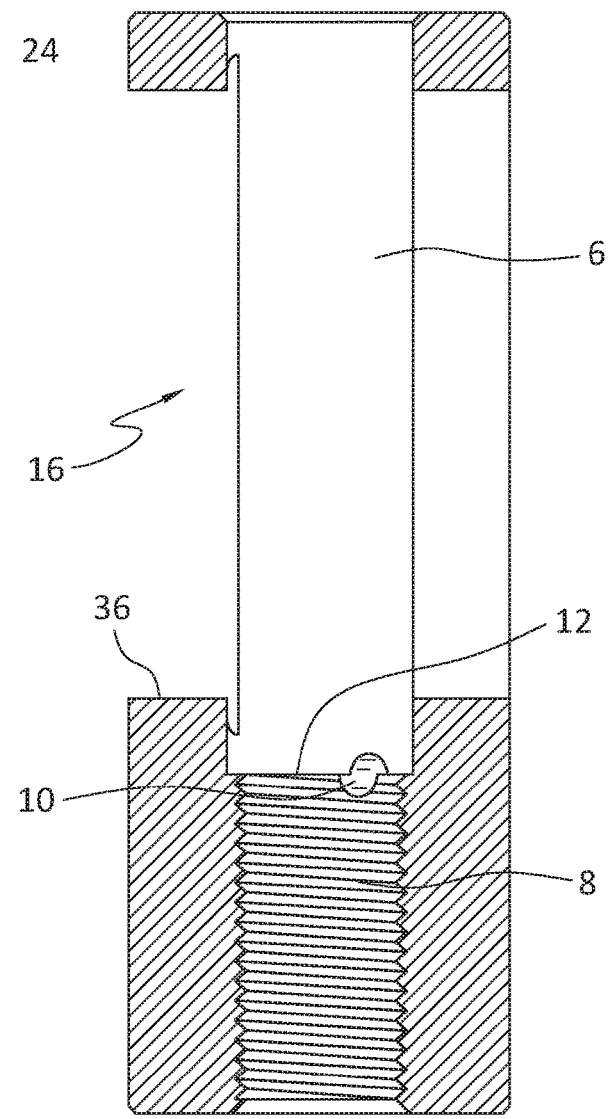
FIG. 3
FIG. 4
FIG. 5

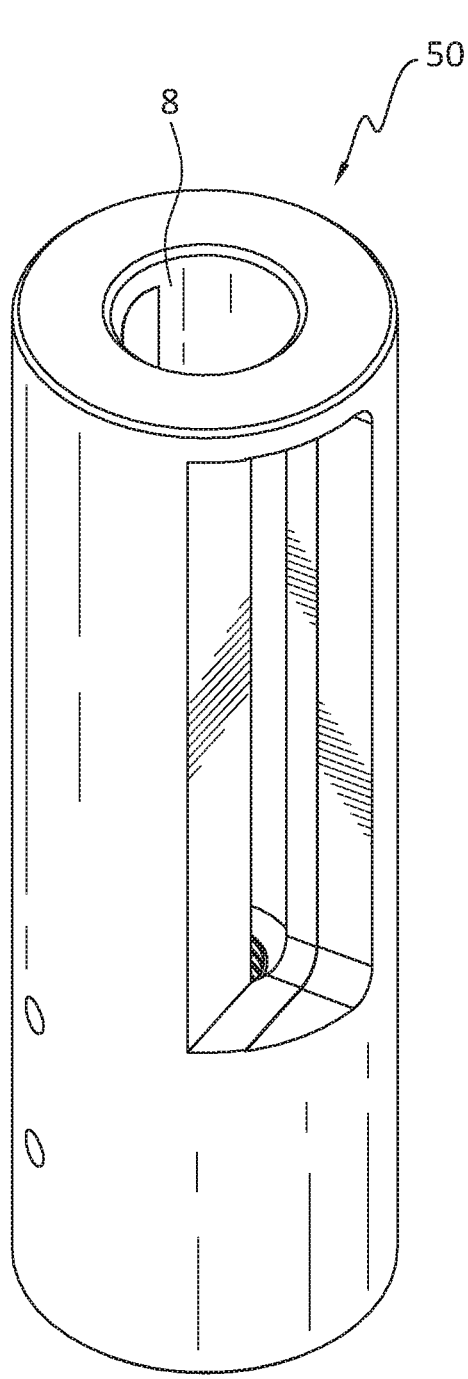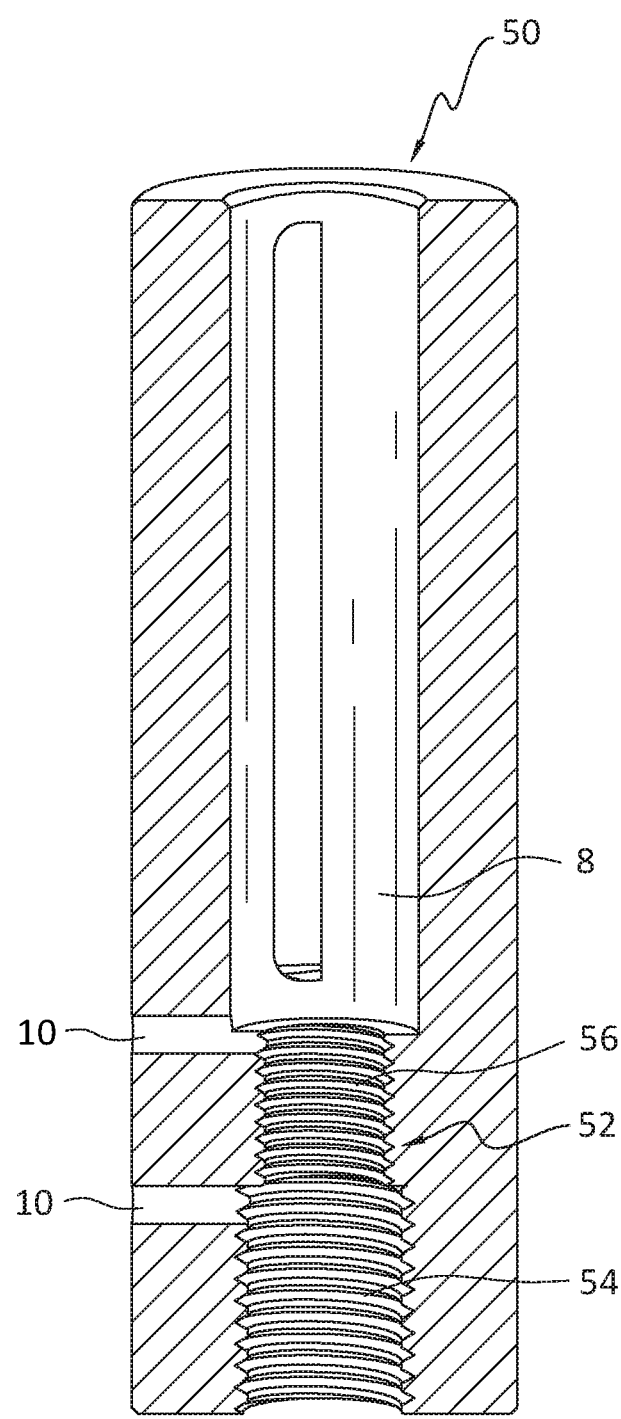
FIG. 12A
FIG. 12B

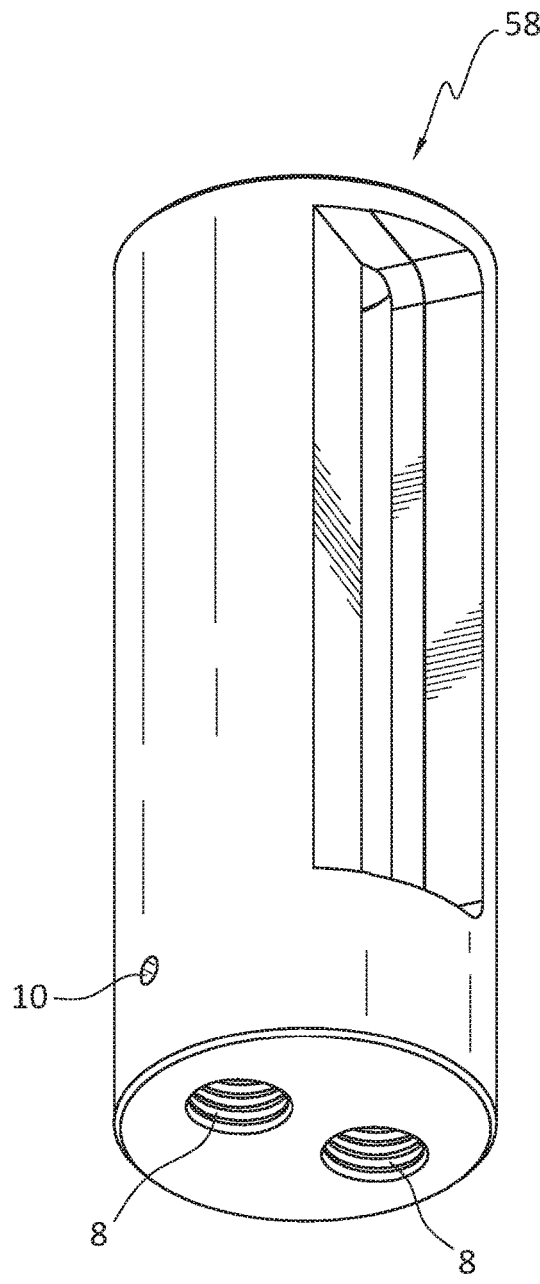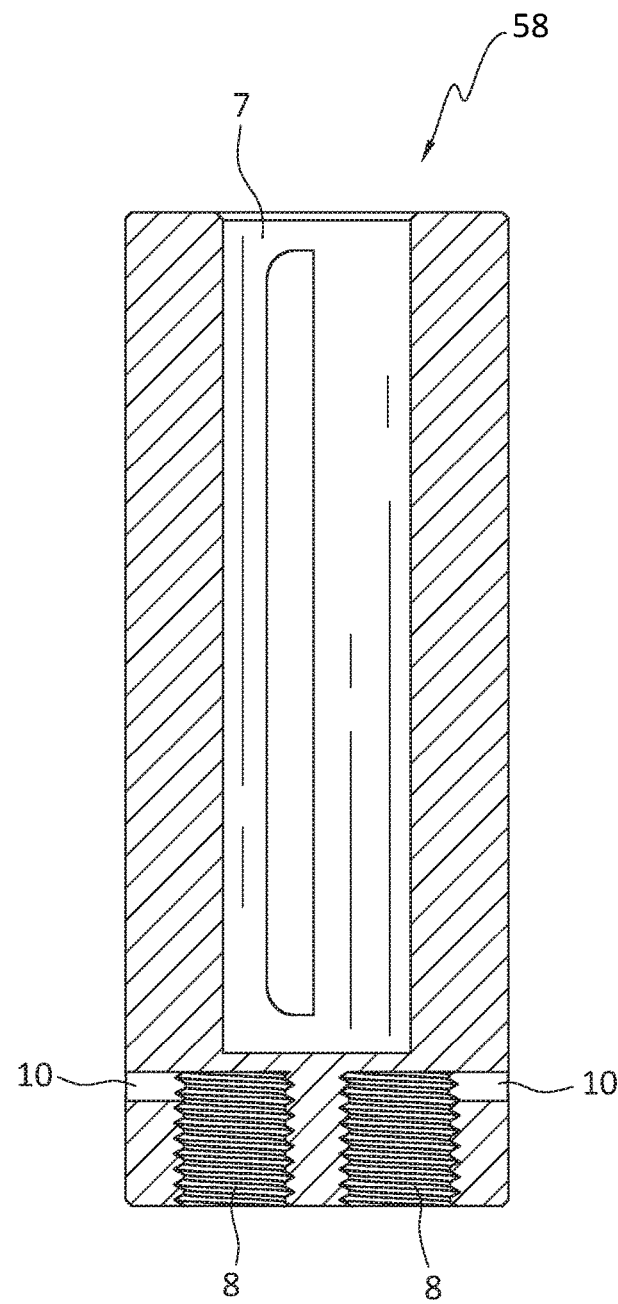
FIG. 13A
FIG. 13B

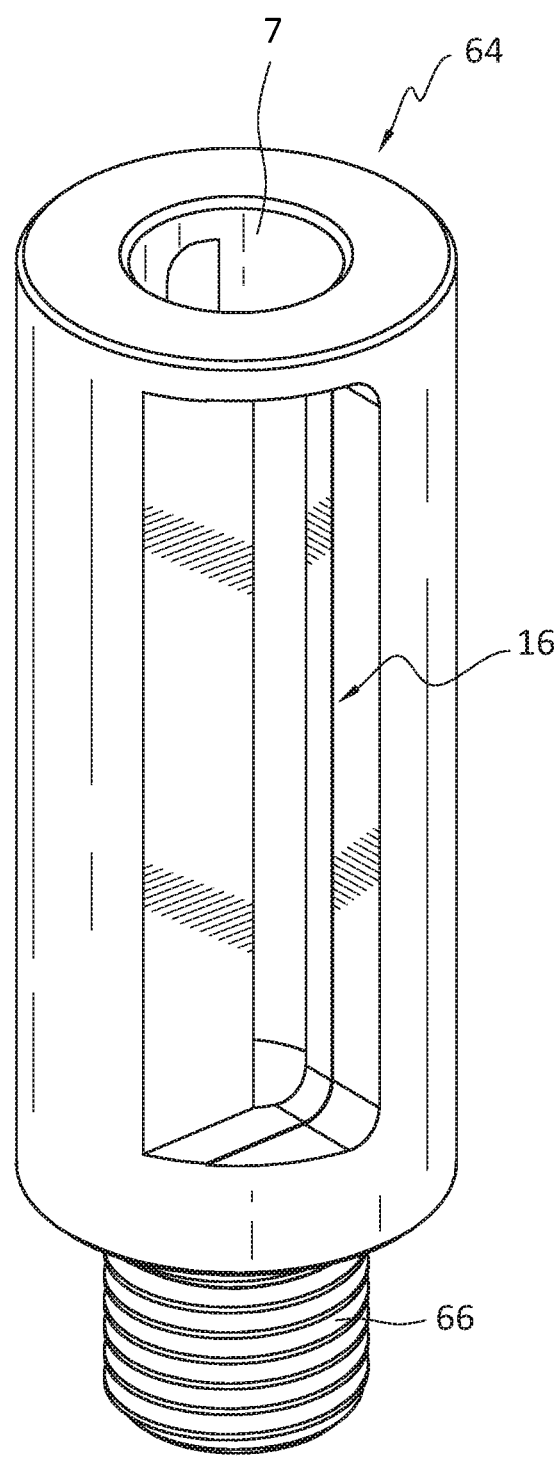
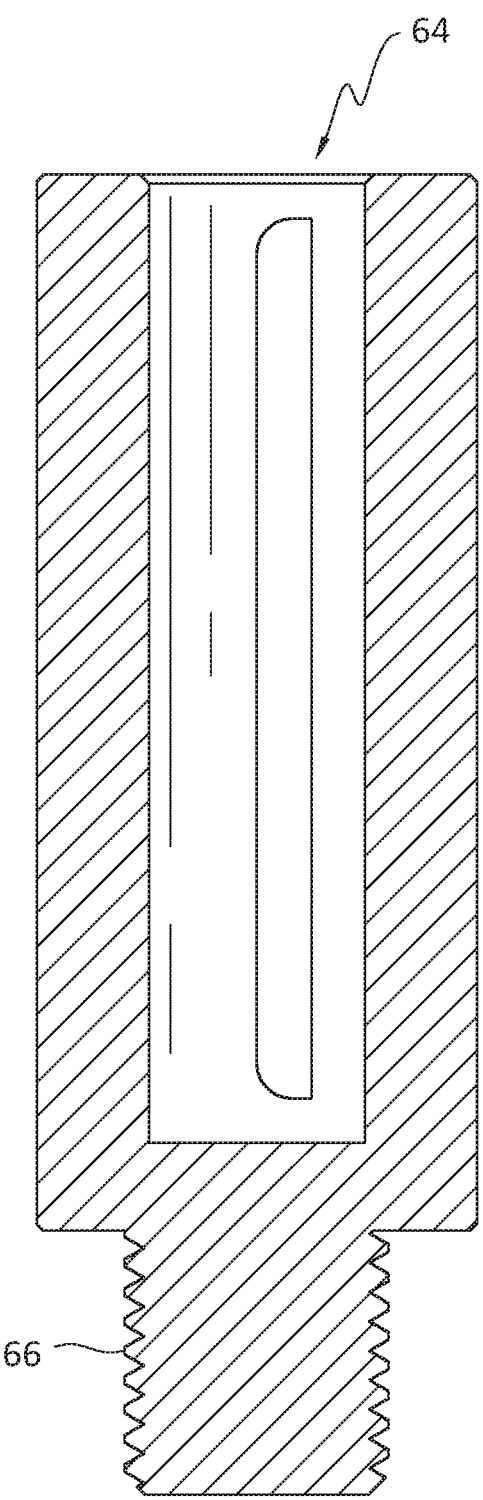
FIG. 15A
FIG. 15B

US 12,345,289 B2

COUPLER FOR CONNECTING A REBAR TO A THREADED ROD OR ANOTHER REBAR

RELATED APPLICATION

This a nonprovisional application claiming the priority of Provisional Application Ser. No. 62/878,329, filed Jul. 24, 2019, hereby incorporated herein by reference.

FIELD OF THE INVENTION

The present invention is generally directed to hold down systems and particularly to couplers used in hold down systems.

BACKGROUND OF THE INVENTION

Hold down systems are used in reinforcing stud walls against tension or compression loads caused by earthquakes, hurricanes, windstorms, etc. Hold down systems use threaded rods anchored to the foundation and operably attached to walls. Examples of hold down systems are disclosed in U.S. Pat. Nos. 6,951,078, 7,762,030, 8,136,318, 8,943,777, 9,097,000, 9,097,001, 9,416,530 and 9,874,009, hereby incorporated by reference.

SUMMARY OF THE INVENTION

The present invention provides a coupler, comprising a cylindrical body having a first end and a second end; the cylindrical body including an axial hole extending from the first end to the second end with a side wall, the axial hole including a first portion for receiving an end portion of a first rod and a threaded second portion for receiving an end portion of a second rod; and the cylindrical body including a first longitudinal cutout extending into the side wall to create a first opening into the first portion of the axial hole to expose the end portion of the first rod to be welded to the cylindrical body.

The present invention also provides a coupler, comprising a cylindrical body having a first end portion and a second end portion; the cylindrical body including an axial blind hole with a side wall, the axial blind hole extending from the first end portion for receiving an end portion of a first rod; the cylindrical body including a first threaded opening in the second end portion for receiving an end portion of a second rod; and the cylindrical body including a first longitudinal cutout extending into the side wall to create a first opening into the axial hole to expose the end portion of the first rod to be welded to the cylindrical body.

The present invention further provides a coupler, comprising a cylindrical body having a first end portion and a second end portion; the cylindrical body including an axial blind hole with a side wall, the axial blind hole extending from the first end portion for receiving an end portion of a first rod; a threaded projection extending from the second end portion for attachment to a second rod; and the cylindrical body including a first longitudinal cutout extending into the side wall to create a first opening into the axial hole to expose the end portion of the first rod to be welded to the cylindrical body.

The present invention provides a coupler, comprising a cylindrical body having a first end and a second end; the cylindrical body including an axial hole extending from the first end to the second end with a side wall, the axial hole for receiving an end portion of a first rod; the cylindrical body including a first threaded opening in the second end portion for receiving an end portion of a second rod; and the cylindrical body including a first longitudinal cutout extending into the side wall to create a first opening into the first portion of the axial hole to expose the end portion of the first rod to be welded to the cylindrical body.

The present invention further provides a coupler, comprising a cylindrical body having a first end and a second end; the cylindrical body including an axial hole extending from the first end to the second end with a side wall, the axial hole including a first portion for receiving an end portion of a first rod and a second portion for receiving an end portion of a second rod; and the cylindrical body including a first longitudinal cutout extending into the side wall to create a first opening into the axial opening; the first opening including a first portion for exposing the end portion of the first rod to be welded to the cylindrical body; and the first opening including a second portion for exposing the end portion of the second rod to be welded to the cylindrical body.

The present also provides a coupler, comprising a cylindrical body having a first end and a second end; the cylindrical body including a first axial hole extending from the first end an intermediate portion of the cylindrical body with a first side wall, the first axial hole for receiving an end portion of a first rod; the cylindrical body including a second axial hole extending from the second end to the intermediate portion of the cylindrical body with a second side wall, the second axial hole for receiving an end portion of a second rod; the cylindrical body including a first longitudinal cutout extending into the first side wall to create a first opening into the first axial hole for exposing the end portion of the first rod to be welded to the cylindrical body; and the cylindrical body including a second longitudinal cutout extending into the second side wall to create a second opening into the second axial hole for exposing the end portion of the second rod to be welded to the cylindrical body.

BRIEF DESCRIPTION OF THE DRAWINGS

FIG. 1 is a perspective view of a coupler embodying the present invention.

FIG. 2 is a right side view of FIG. 1.

FIG. 3 is a left side view of FIG. 1.

FIG. 4 is a cross-sectional view along line 4-4 in FIG. 3.

FIG. 5 is a cross-sectional view taken along line 5-5 in FIG. 2.

FIG. 12A is a perspective view of another embodiment of a coupler similar to the coupler of FIG. 1, showing a threaded opening with multiple diameters.

FIG. 12B is an axial cross-section of FIG. 12A, showing the multiple diameters threaded opening and the locations of the sight holes.

FIG. 13A is a perspective view of another embodiment of a coupler, showing threaded openings off-set from a central axis of the coupler.

FIG. 13B is an axial cross-section of FIG. 13A, the the off-set threaded openings and the locations of the sight holes.

FIGS. 15A and 15C are perspective views of another embodiment of a coupler, showing a male threaded projection, one smaller than the other.

FIGS. 15B and 15D are axial cross-sections of the respective couplers of FIGS. 15A and 15C.

DETAILED DESCRIPTION OF THE INVENTION

Figure 7:
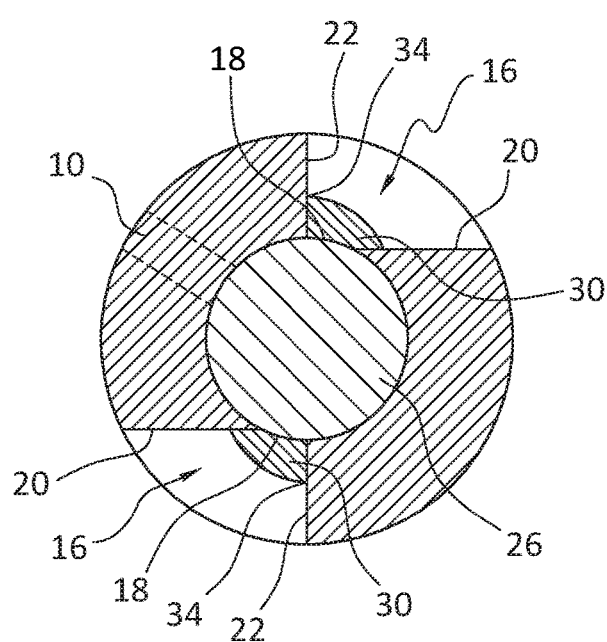
FIG. 7 is a cross-sectional view along line 7-7 in FIG. 6.

Referring to FIGS. 1-5, a coupler 2 embodying the present invention is disclosed. The coupler 2 may be used as a transition coupler in coupling a rebar to a threaded rod or another rebar of the same or different size. The coupler 2 advantageously provides a fixture or welding jig for proper welding of the rebar to the coupler. The coupler 2 is preferably made of steel.

The coupler 2 is preferably a cylindrical body 4 with an axial hole 6 extending from one end into an intermediate portion of the body 4 and a threaded axial hole 8 extending from the opposite end into the intermediate portion of the body 4. The hole 6 is for receiving a rebar and the hole 8 for a threaded rod. The hole 6 has a side wall 7. The holes 6 and 8 are preferably co-axial. The hole 6 may be of a larger diameter than the diameter of the hole 8. The hole 6 may be longer than the hole 8.

A sight hole 10 may be provided as a way to visually check the maximum extent of travel of the threaded rod and the rebar into the respective holes 6 and 8. The sight hole 10 is preferably disposed radially and is bisected by a plane 12 representing the juncture between the ends of the of the threaded rod and the rebar.

The hole 6 has a cylindrical wall 14 with two opposite V-shaped cutouts 16 (see FIG. 4) that provide respective openings 18 into the hole 6. Each of the cutouts 16 has wall surfaces 20 and 22. The wall surfaces 20 are preferably parallel and the wall surfaces 22 coplanar. The wall surface 20 is preferably perpendicular to the wall surface 22. The openings 18 are longitudinal that expose a correspondingly longitudinal surface of the rebar for welding to the adjacent wall surfaces 20 and 22 of the respective cutouts 16. The cutouts 16 preferably start below the top end of the body 4 to provide a collar portion 24 for structural integrity of the body 4 (see FIG. 5). During the welding process, the collar portion 24 advantageously keeps the size of the opening 18 from expanding due to the heat generated by the welding process. The cutouts 16 preferably end before the bottom of the hole 6 to ensure that even if the end of the rebar were not cut square, a portion of the rebar presented at the openings 18 are just as long as the length of the openings 18. The hole 6 is preferably longer in length than the length of any of the openings 18. The hole 6 advantageously extends below the surface 36 to keep the weld away from the thread of the threaded opening 8 during the welding process.

Referring to FIGS. 1 and 4, the wall surfaces 22 are provided with a guide 34 to inform the welder of the required throat or thickness of the weld. The guide 34 may be a line scored into the surfaces 22 and may extend into the surfaces 36.

Figure 6:
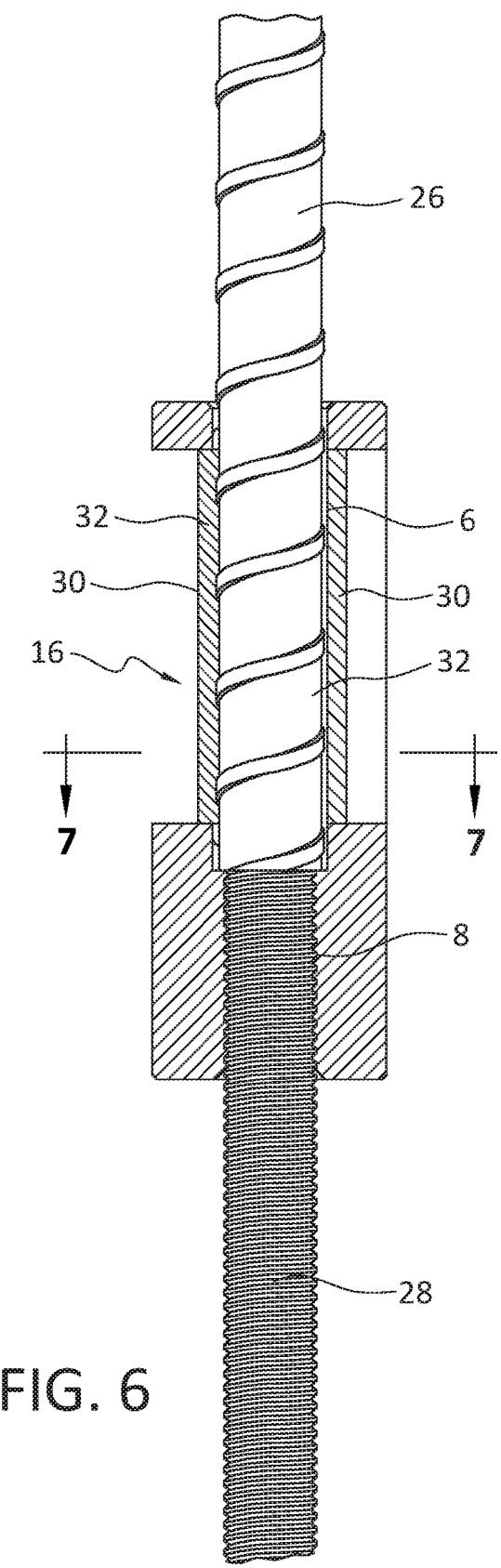
FIG. 6 is a cross-sectional view shown in FIG. 5 with a rebar and a threaded rod received in the respective holes of the coupler.

Referring to FIGS. 6 and 7, a rebar 26 is inserted into the hole 6 and welded to the coupler 2, using the openings 18 to attach the welding beads 30 to the exposed surfaces 32 of the rebar through the openings 18 and the adjacent wall surfaces 20 and 22 of the respective cutouts 16. Because the hole 6 extends below the surface 36, the welding material is advantageously prevented from fouling the threaded hole 8, thus keeping the thread clean. A threaded rod 28 is threaded into the hole 8.

Referring to FIGS. 8A-8D, the coupler 2 is modified as coupler 38 with three cutouts 16 providing three openings 18 preferably arranged equidistantly around the hole 6. Providing three openings 18 advantageously provide three welding beads 30 on the rebar 26 arranged at three angular positions around the rebar 26 for a relatively strong connection to the coupler 38. In this manner, the length of the openings 18 may be reduced and the coupler 38 may be made shorter. The openings 18 may be arranged angularly equidistantly around the rebar 26.

Figures 8A, 8B:
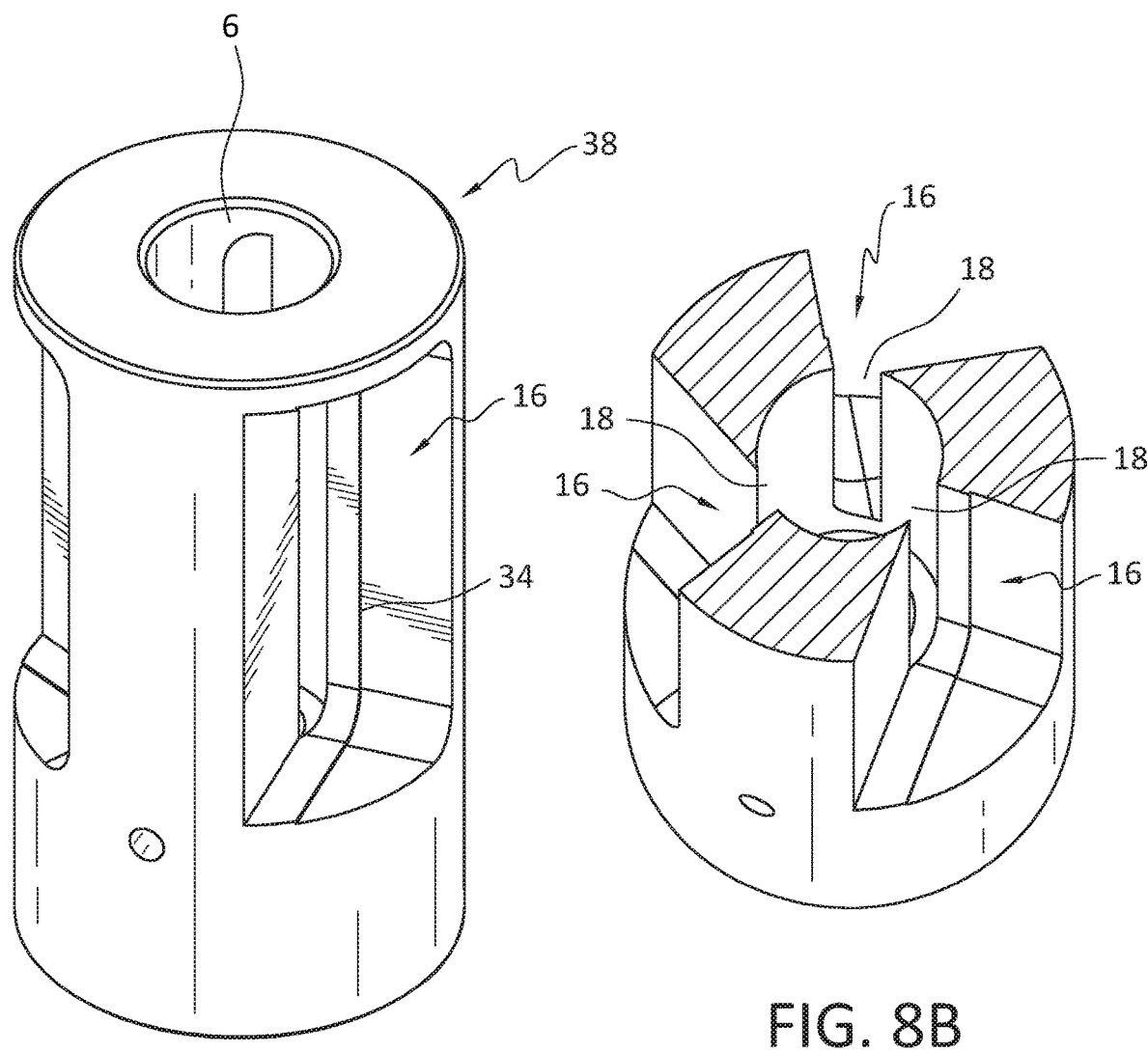
FIG. 8A is a perspective view of a modification of the coupler of FIG. 1.
FIG. 8B is a perspective view of the coupler of FIG. 8A shown partly in cross-section.
Figures 8C, 8D:
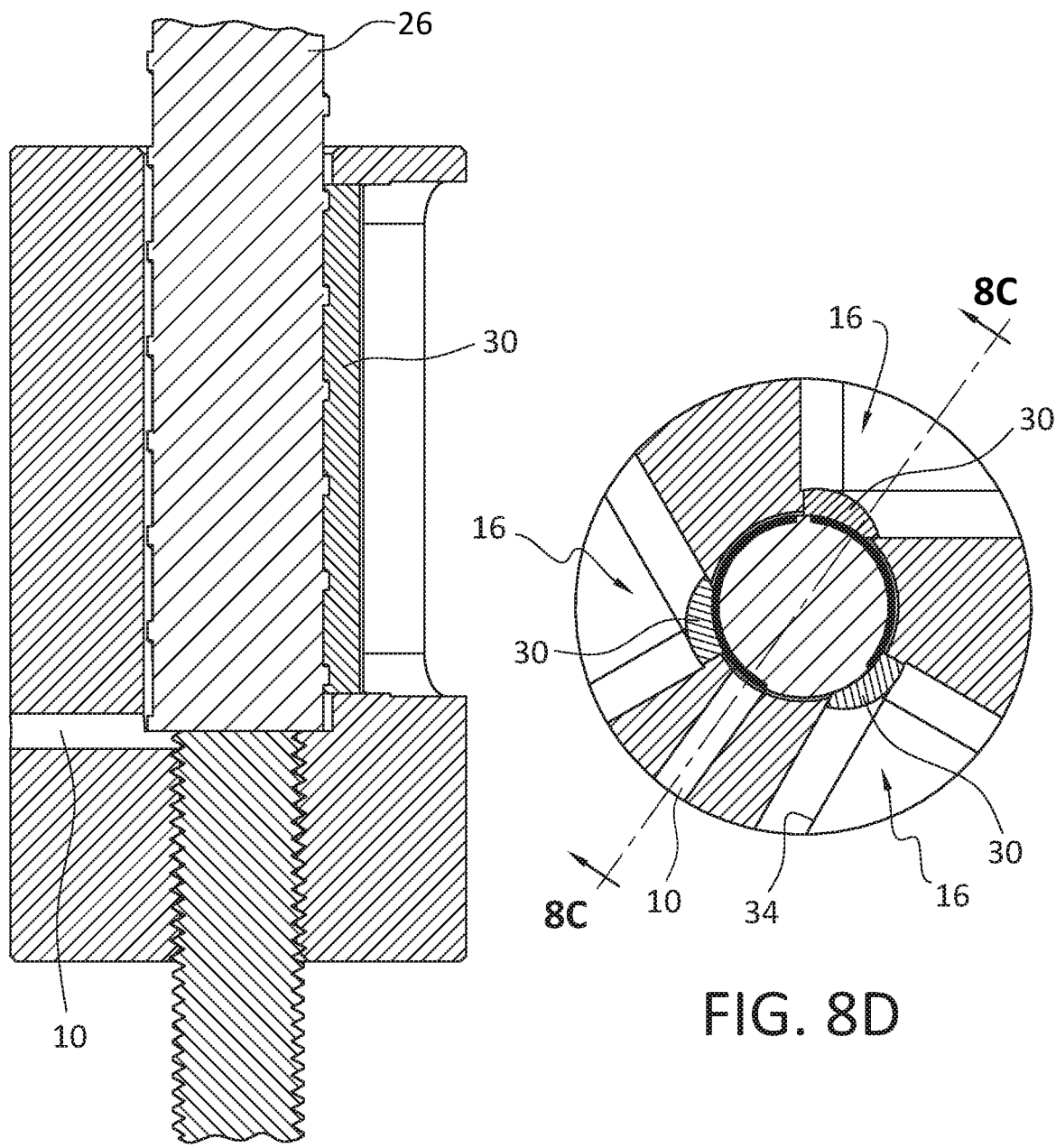
FIG. 8C is an elevational view of the coupler of FIG. 8A shown in an axial cross-section with a rebar and a threaded rod.
FIG. 8D is a radial cross-section taken across the coupler and the rebar of FIG. 8C.
Figure 8E:
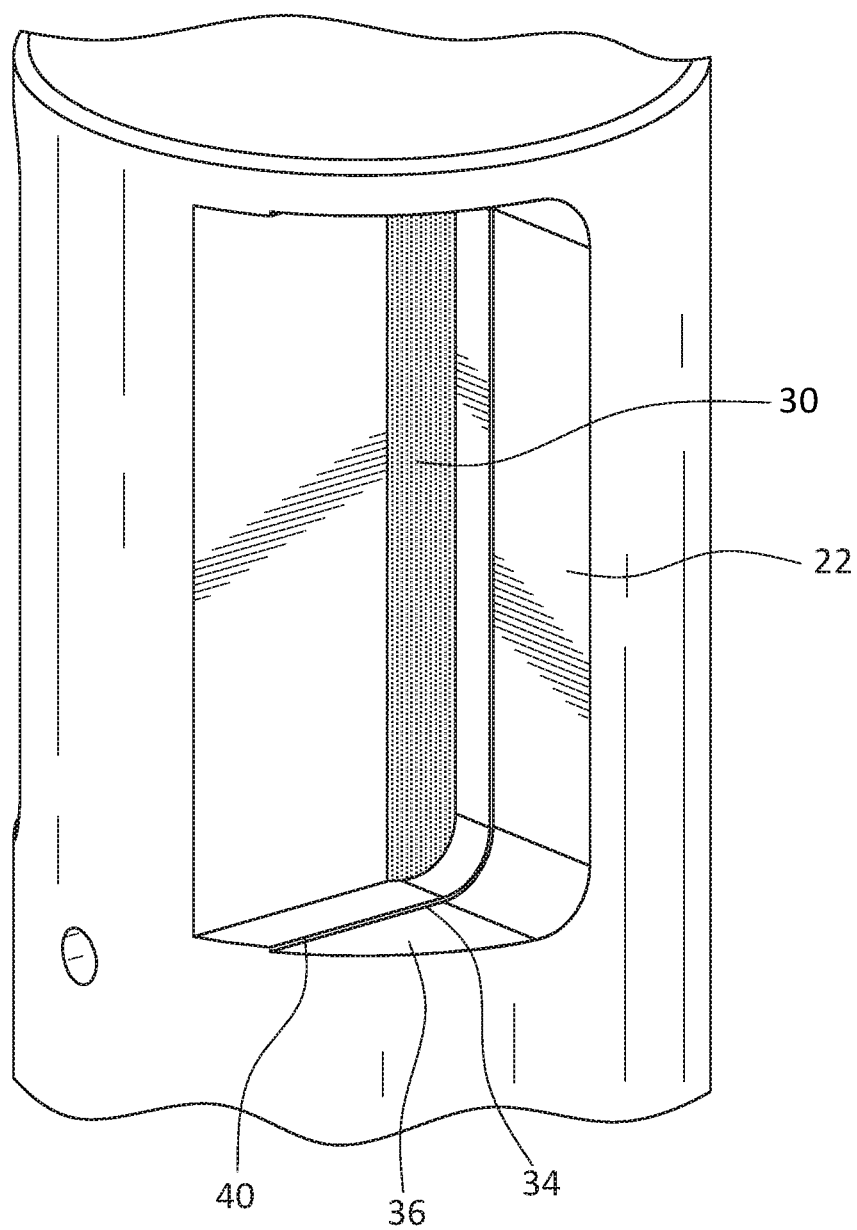
FIG. 8E is a partial view of the coupler of FIG. 8A, showing a detail of a welding guide.

Referring to FIG. 8E, the guide 34 is provided by a shoulder 40 on the surfaces 22 and 36 by lowering the outer portion of the surfaces 22 and 36 relative to the adjacent inner surfaces.

Figure 9:
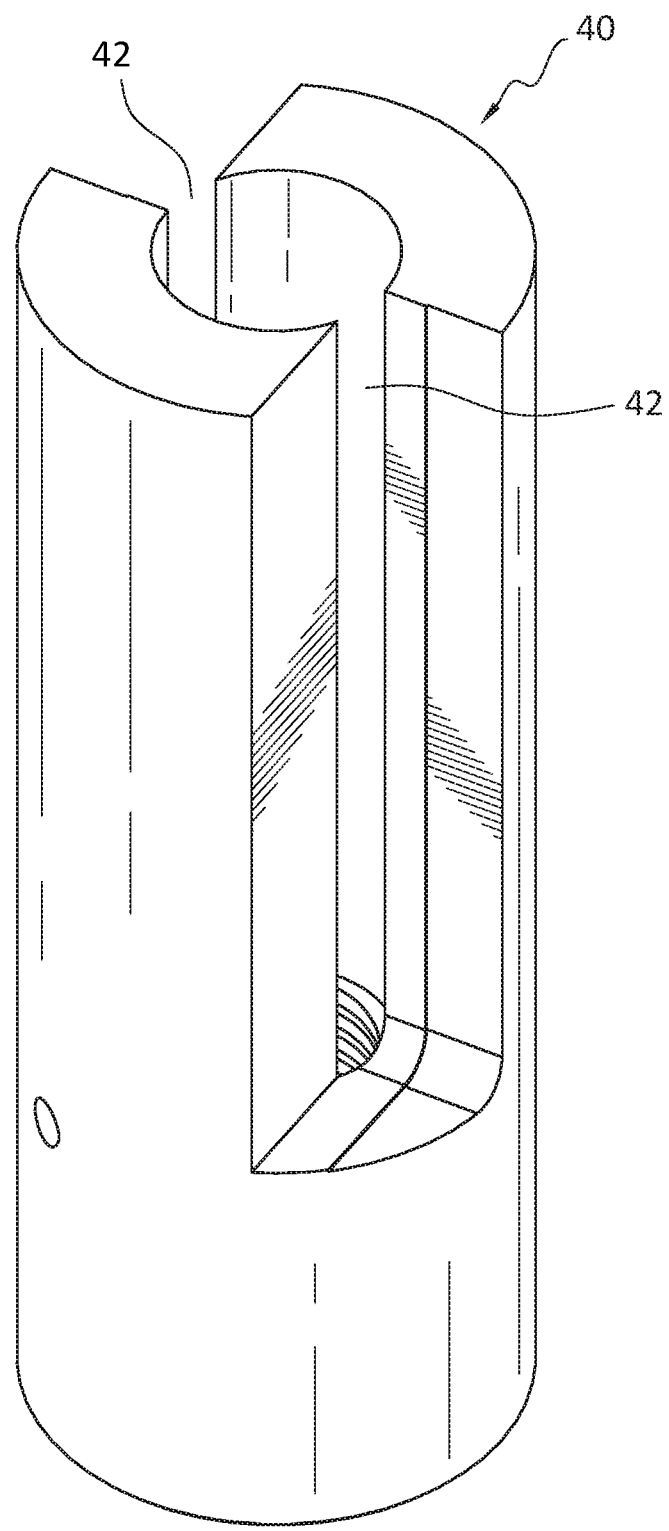
FIG. 9 is a perspective view of another embodiment of a coupler.

Referring to FIG. 9, the coupler 2 is modified as coupler 40 by removing the collar portion 24 of the coupler 2 to provide a U-shaped opening 42. During the welding process, the rebar 26 at the upper end of the opening 42 is welded first to the coupler 40 to prevent the opening 42 from expanding from the generated heat. The embodiment of the coupler 40 may also be applied to the embodiment of the coupler 38 and other embodiments of the coupler disclosed herein.

Figures 10A, 10B:
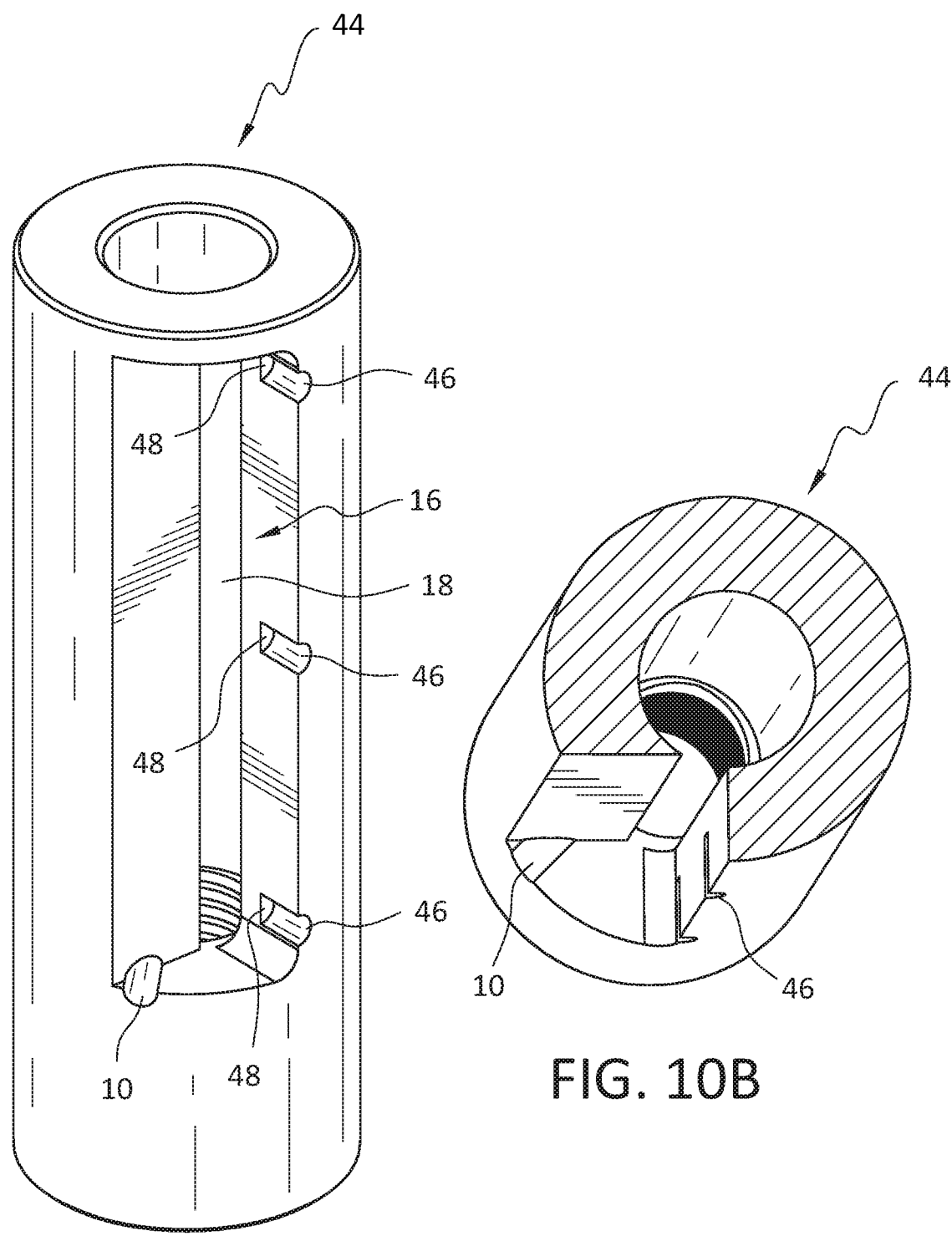
FIG. 10A is a perspective view of another embodiment of a coupler, showing another embodiment of a welding guide and another location for a sight hole.
FIG. 10B is a perspective view of the the coupler of FIG. 10A shown partly in cross-section.
Figure 10C:
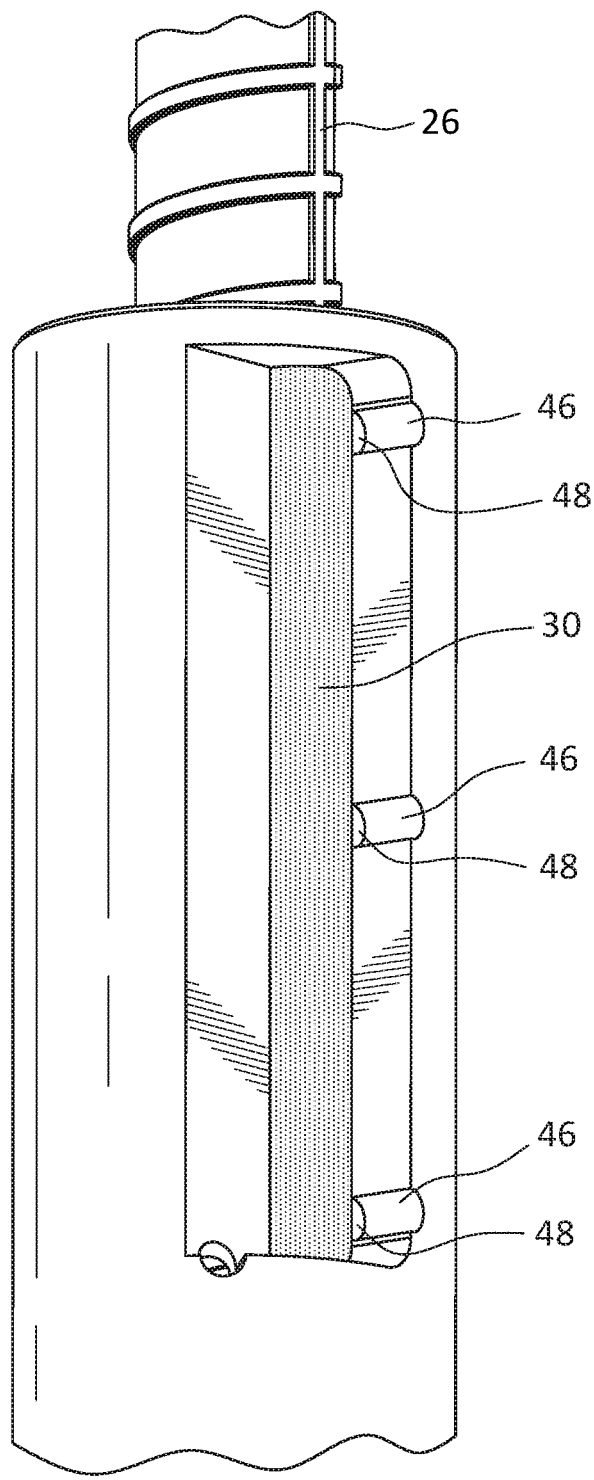
FIG. 10C is a perspective view of the coupler of FIG. 10A, showing a rebar welded to the coupler.

Referring to FIGS. 10A-10C, the coupler 2 is modified as coupler 44 by providing only one cutout 16. The guide 34 is provided by a plurality of recesses 46 with respective end walls 48. The recesses 46 may be half-circular wall in cross-section. The end walls 48 are advantageously disposed the same distance from the edge of the opening 18 as provided by the guide 34. The welding bead 30 must extend radially to the end walls 48 or beyond to fill a portion of the recesses 46. The sight hole 10 may be disposed in the cutout 16 for convenience of use. The recesses 46 and the location of the sight hole 10 may also be used with the couplers 2, 38, 40 and other embodiments of the coupler disclosed herein.

Figure 11:
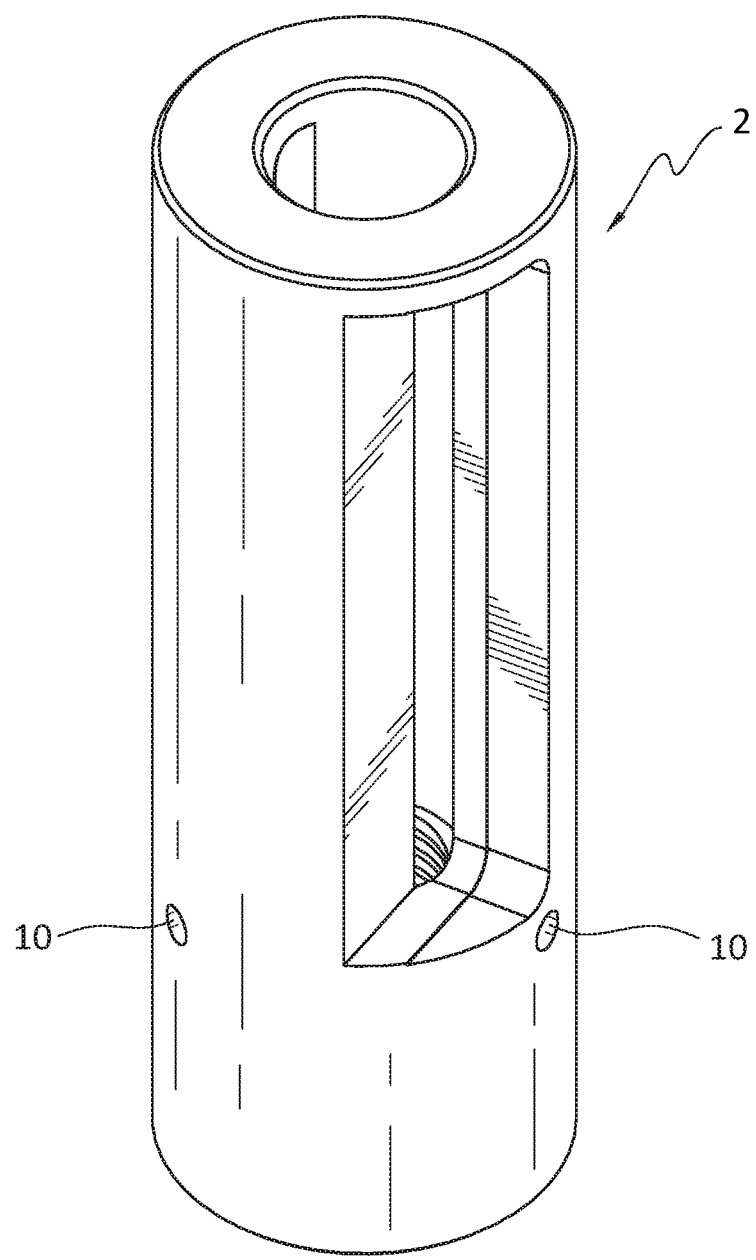
FIG. 11 shows the coupler of FIG. 1 with multiple sight holes.

Referring to FIG. 11, the coupler 2 is provided with multiple sight holes 10 for ease of use. The location of the sight hole 10 in FIG. 10A may also be one of the multiple locations. Multiple sight holes may also be used for the couplers 38, 40, 44 and other embodiments of the coupler disclosed herein.

Referring to FIGS. 12A and 12B, the coupler 2 is modified as coupler 50 with multiple diameter threaded hole 52, including a larger threaded opening 54 and a smaller diameter threaded opening 56. Sight holes 10 are provided at the juncture between the openings 54 and 56 and at the juncture between the openings 56 and 8. Multiple diameter threaded hole 52 and the associated sight holes 10 may also be used with the couplers 38, 40, 44 and other embodiments of the coupler disclosed herein.

Figure 13C:
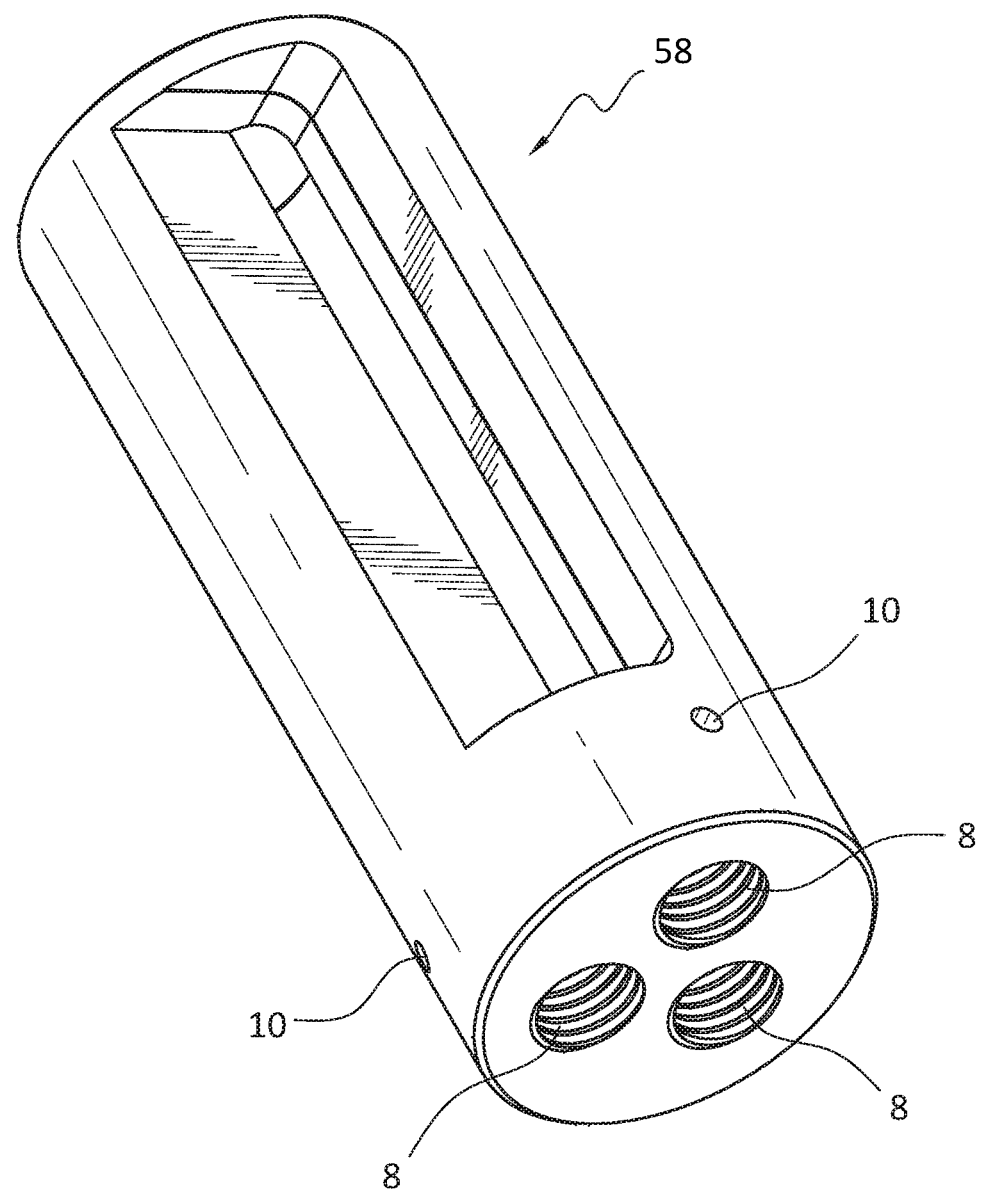
FIG. 13C is a perspective view of the coupler of FIG. 13A, showing three threaded openings off-set from the central axis of the coupler.
Figure 13D:
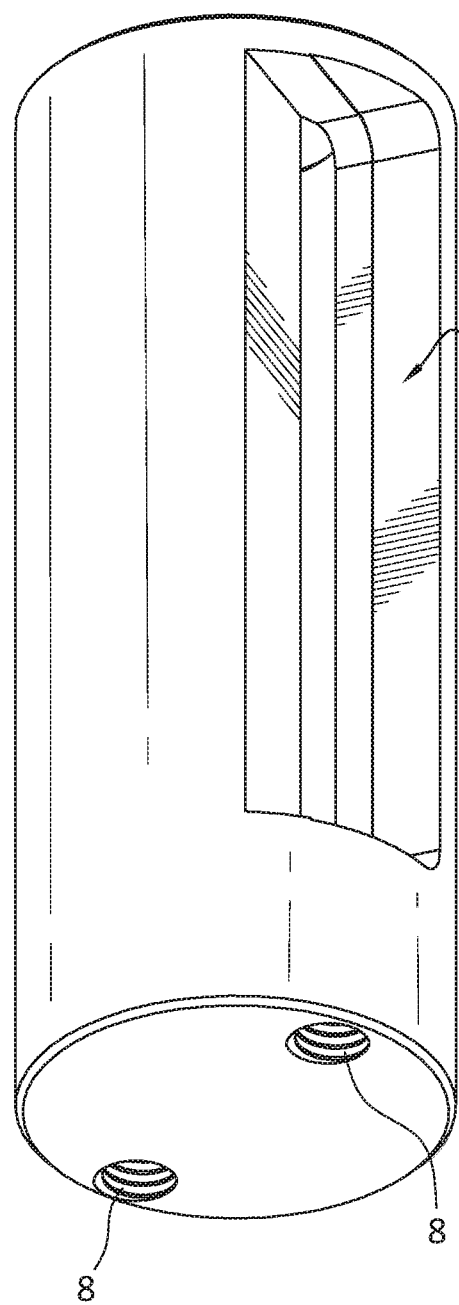
FIGS. 13D and 13E are perspective views of the coupler of FIG. 13A, showing alternative locations of the threaded openings.
Figure 13E:
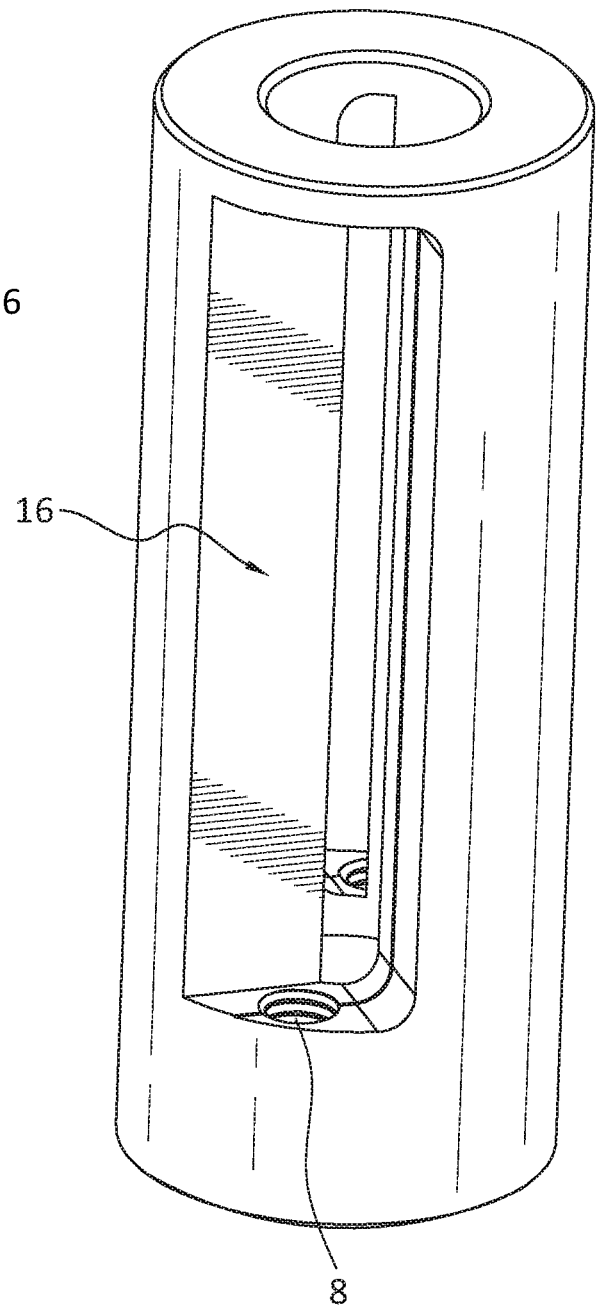
Figures 13F, 13G:
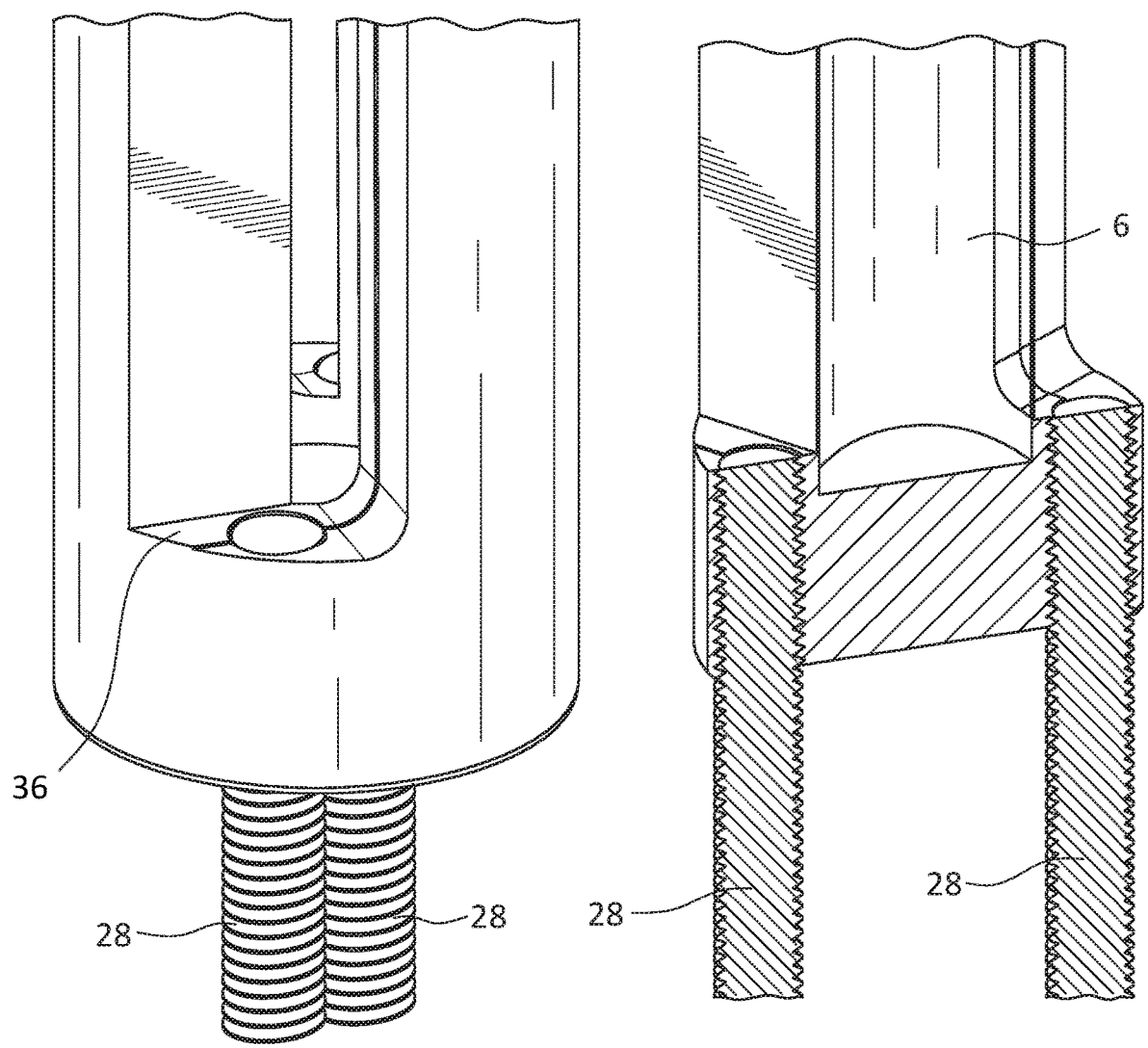
FIG. 13F is a perspective view of a portion of the coupler shown in FIG. 13E, showing the ends of threaded rods visible in the respective cutouts in the coupler.
FIG. 13G is a perspective view of the coupler shown in FIG. 13F shown in cross-section.

Referring to FIGS. 13A-13E, the coupler 2 is modified as coupler 58 by providing multiple off-center openings 8 and modifying the hole 6 as blind hole 7. In FIGS. 13A-13C, the threaded holes 8 are blind holes and are provided with respective sight holes 10 at the bottom of the holes 8. In FIGS. 13D-13G, the holes 8 terminate in the respective cutouts 16, advantageously allowing a visual check of the ends of the threaded rods 28 to confirm correct rod installation when the end of the rods 28 are flush with the surfaces 36 of the cutouts 16. The holes 8 may also be provided with the multi-diameter hole 52 as shown with the coupler 50. The off-center openings 8 may also be used with the couplers 38, 40, 44 and other embodiments of the coupler disclosed herein.

Figure 14A:
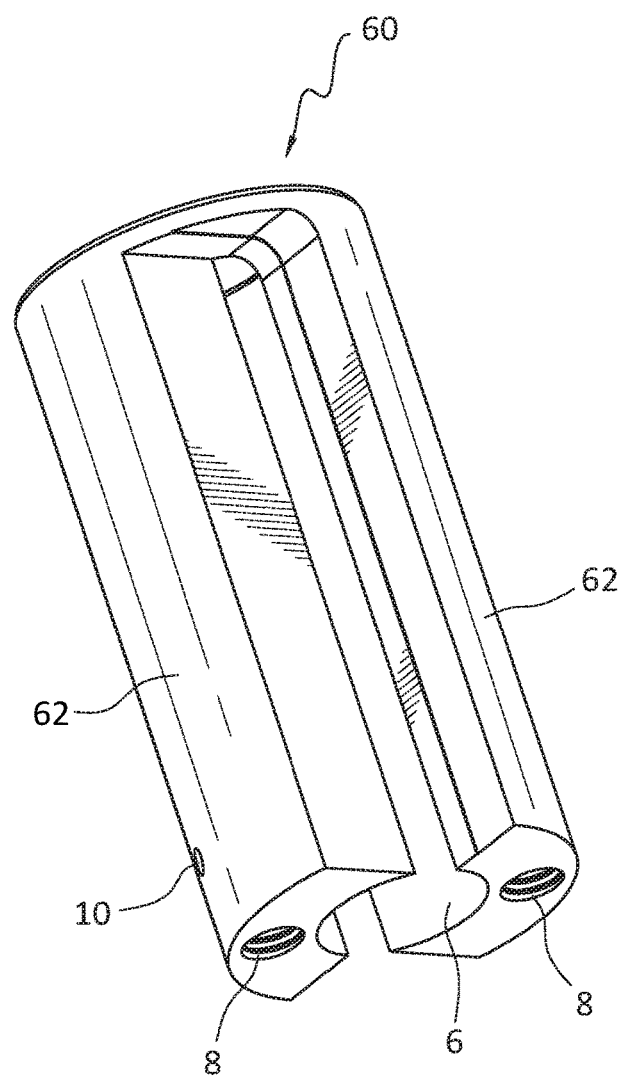
FIG. 14A is a perspective view of another embodiment of a couple, showing an alternative location of the threaded holes.
Figure 14B:
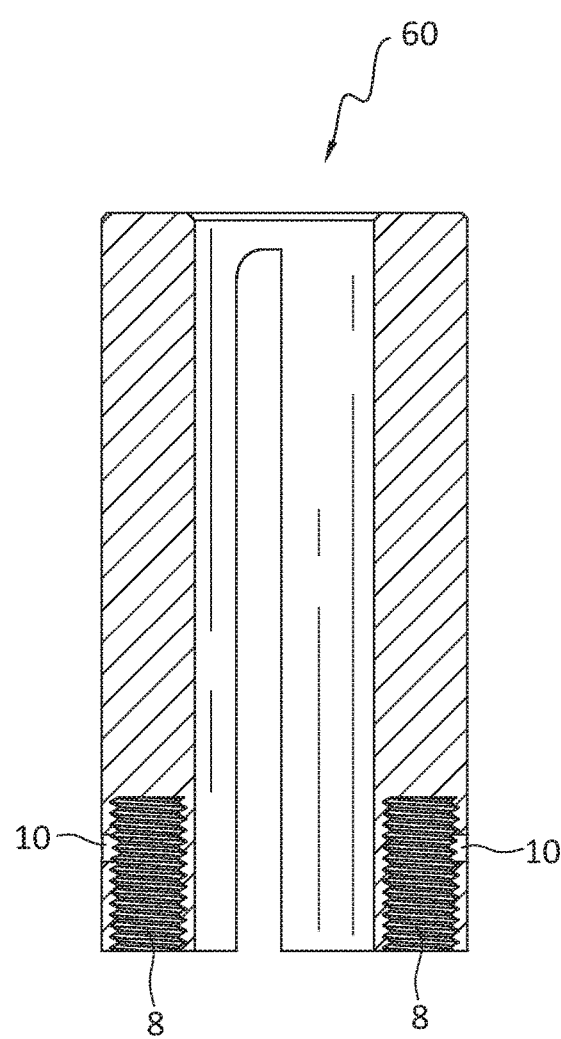
FIG. 14B is an axial cross-section of the coupler of FIG. 14A.

Referring to FIGS. 14A and 14B, the coupler 2 is modified as coupler 60 by extending the cutouts 16 and the opening 8 to the bottom of the coupler. The threaded holes 8 are provided in the walls 62 of the coupler with respective sight holes 10 at the appropriate height to ensure the required number of thread engagement by the threaded rods 28. The holes 8 may also be provided with the multi-diameter hole 52 as shown with the coupler 50. The coupler 60 may also be provided with a single cutout 16, as shown with the coupler 44, or three cutouts 16 as shown with the coupler 38.

Figure 14C:
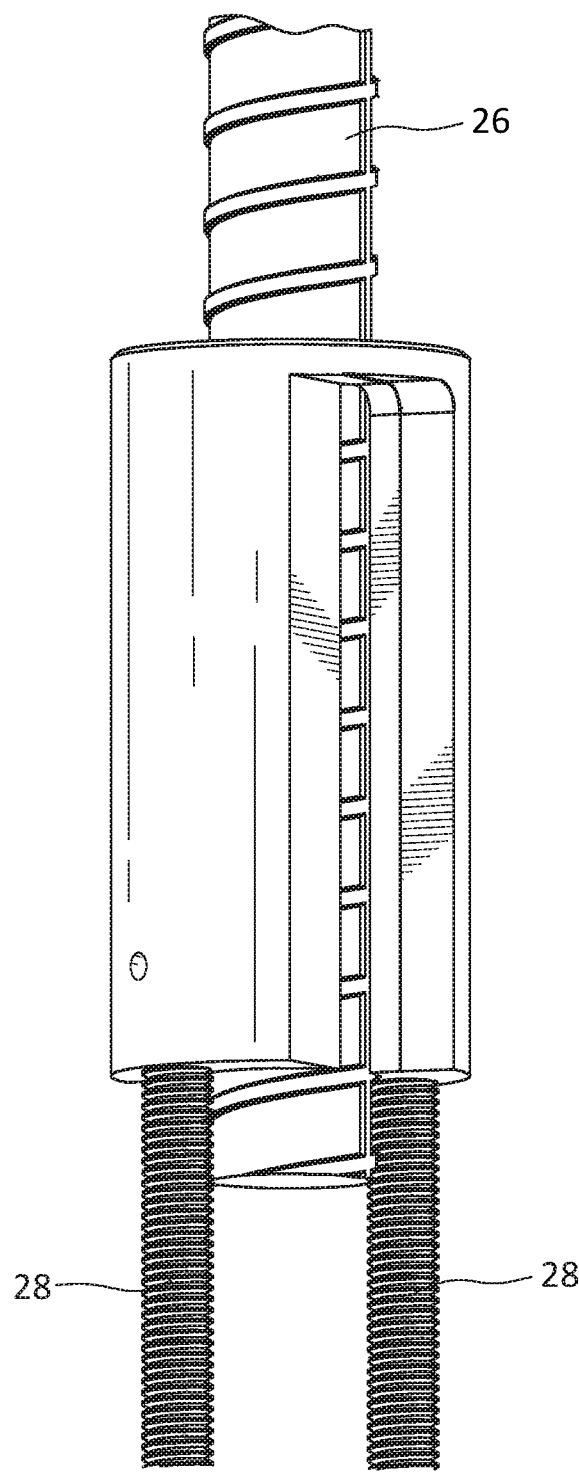
FIG. 14C is a perspective view of the coupler of FIG. 14A, showing a rebar and threaded rods attached to the coupler.
Figure 14D:
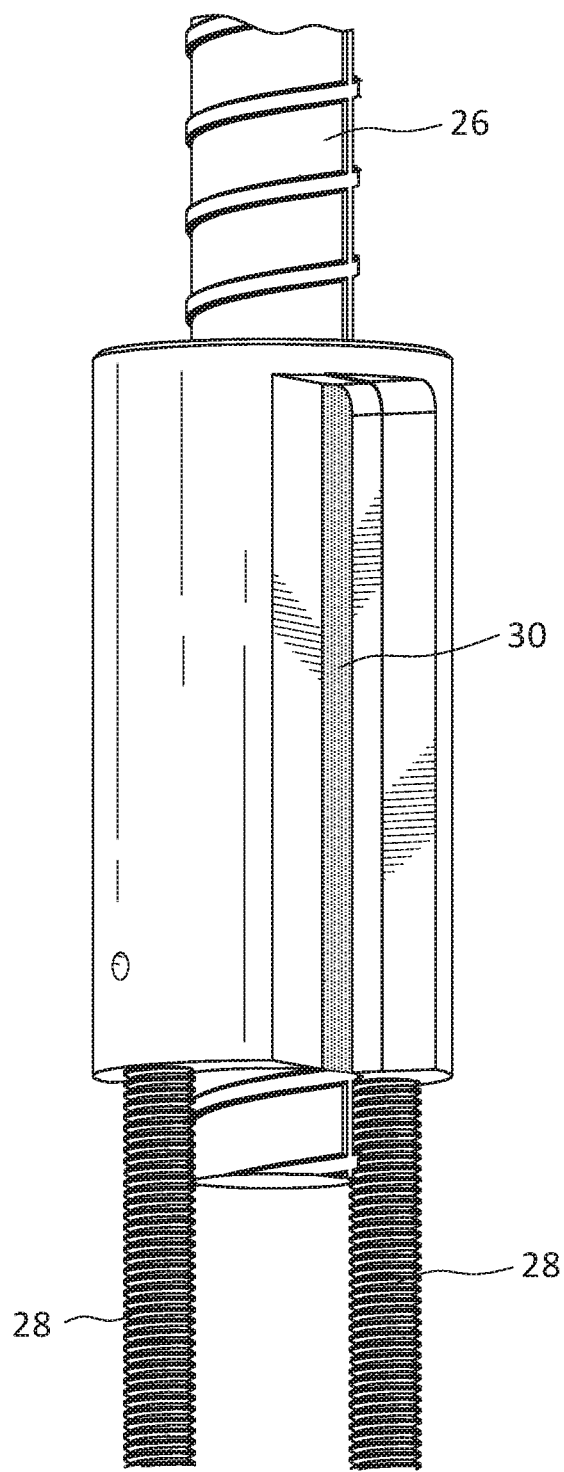
FIG. 14D shows the coupler of FIG. 14C with the rebar welded to the coupler.

Referring to FIGS. 14C and 14D, the rebar 26 extends past the coupler 60. Threaded rods 28 are attached to the respective holes 8. Sight holes 10 provides visual inspection of the extent of travel of the threaded rods 28 inside the holes 8.

Figure 15C:
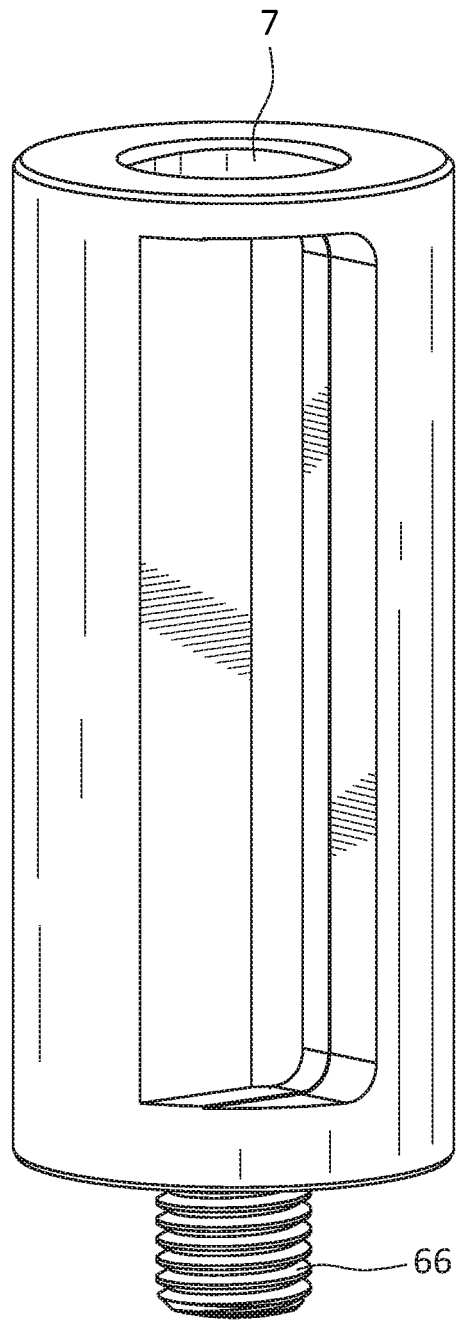
Figure 15D:
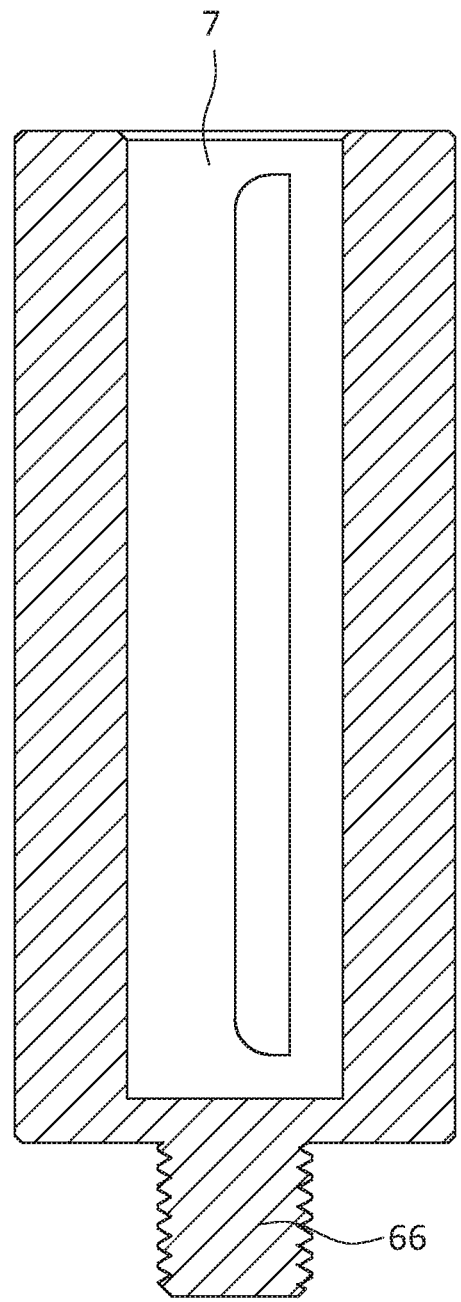
Figure 15E:
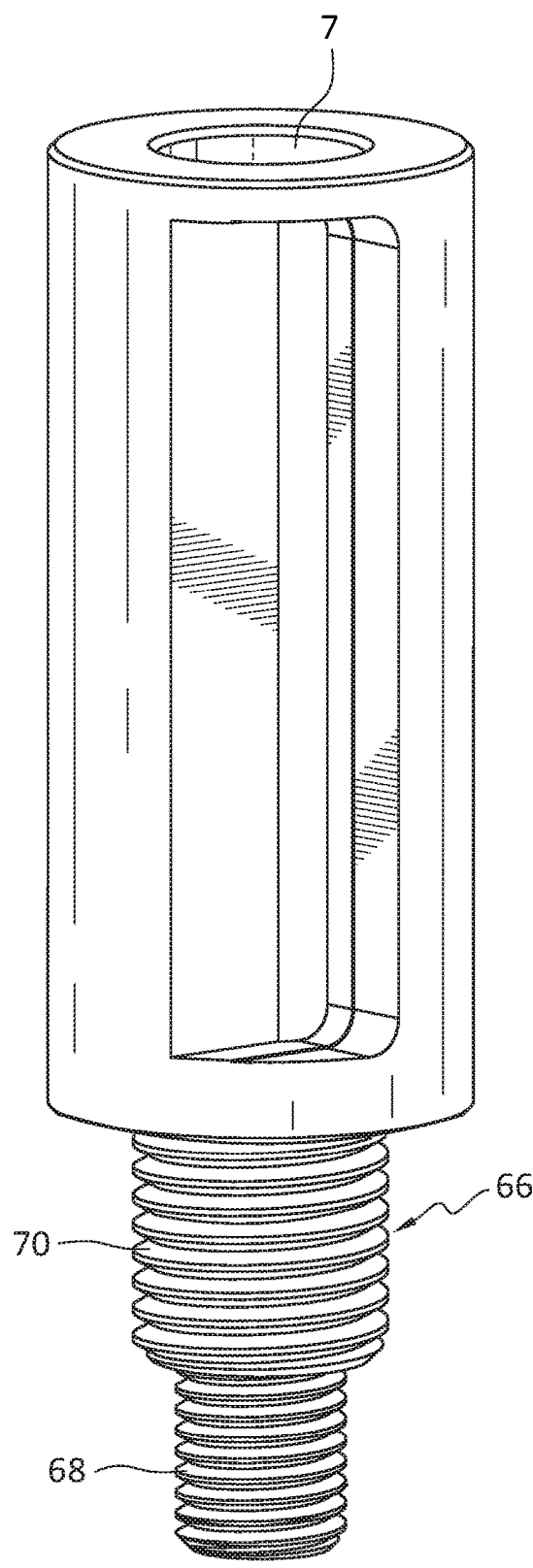
FIG. 15E is a perspective view of another embodiment of the coupler shown in FIG. 15A, showing the male threaded projection as having multiple diameters.
Figure 15F:
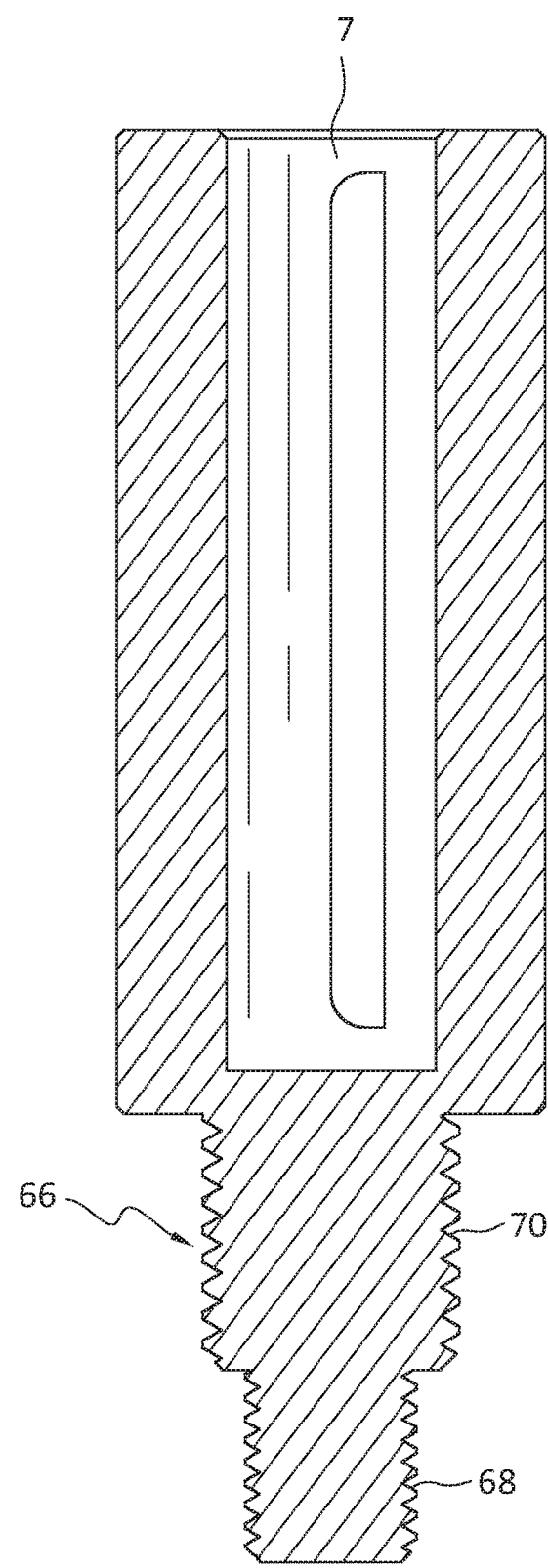
FIG. 15F is an axial cross-section of the coupler of FIG. 15E.

Referring to FIGS. 15A-15F, the coupler 2 is modified as coupler 64 by replacing the threaded hole 8 with a male threaded projection 66 and modifying the hole 6 as a blind hole 7. The projection 66 may be threaded to a threaded bore provided at one end of a rod. The diameter of the projection 66 may be larger than the diameter of the opening 6, as shown in FIGS. 15A and 15B, or smaller, as shown in FIGS. 15C and 15D. The projection 66 may also be multi-diameter, with a smaller diameter portion 68 and a larger diameter portion 70. The coupler 64 may also be provided with three cutouts 16 as shown with the coupler 38.

Figures 16A, 16B:
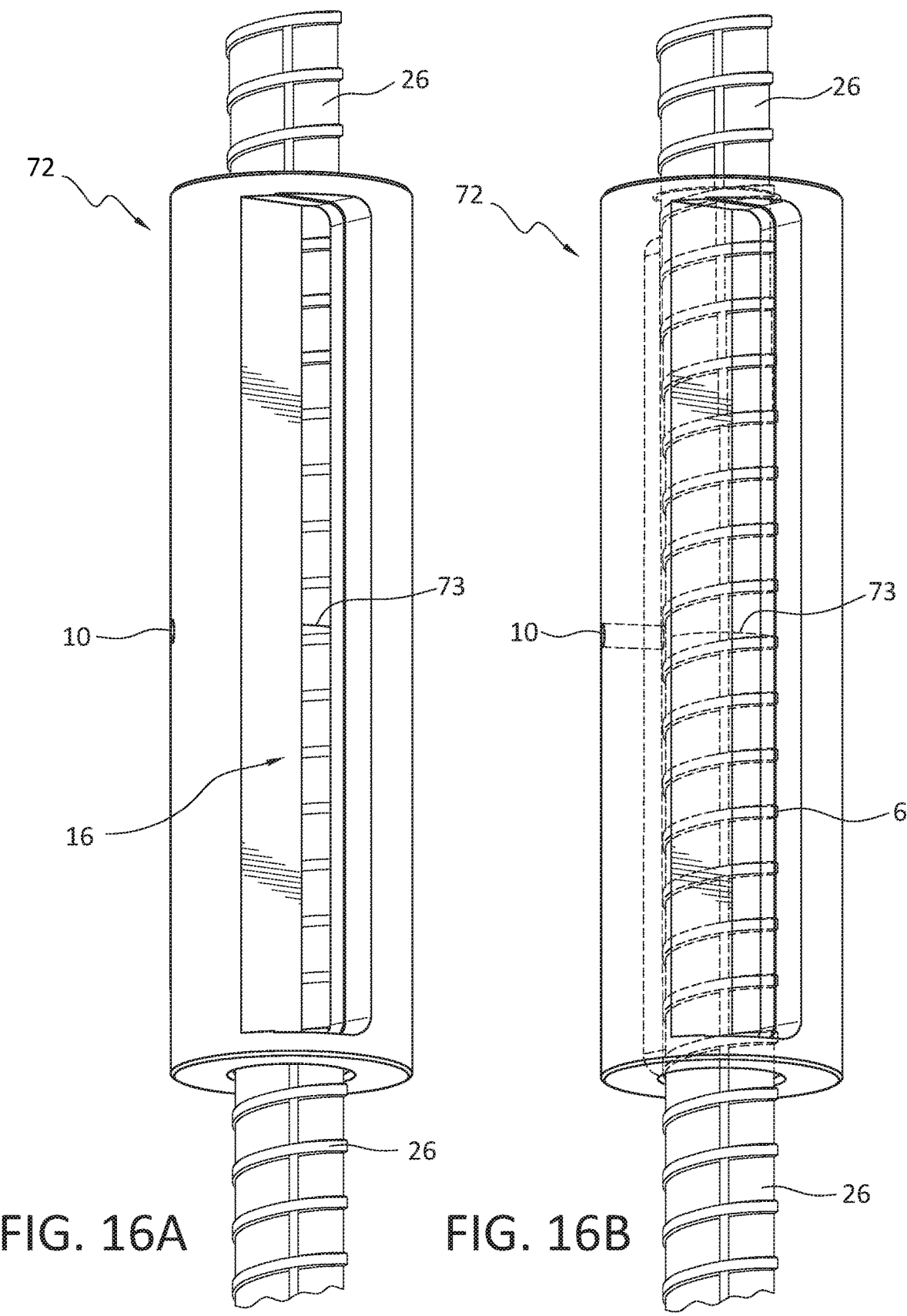
FIGS. 16A and 16B are perspective views of another embodiment of the coupler of FIG. 1, showing two rebars attached to the coupler.

Referring to FIGS. 16A and 16B, the coupler 2 is modified as coupler 72 for joining two rebars 26. A sight hole 10 is provided at a midway point where the ends 73 of the rebars 26 meet. The cutout 16 is shared by both rebars 26. The hole 6 extends the whole length of the coupler 72. The rebars 26 are welded to the coupler 72 and to each other where their ends 73 meet. Another cutout 16 may be provided diametrically opposite to the one shown in a similar manner as with the coupler 2 or provided with two additional cutouts 16 in same manner as with coupler 38.

Figures 17A, 17B:
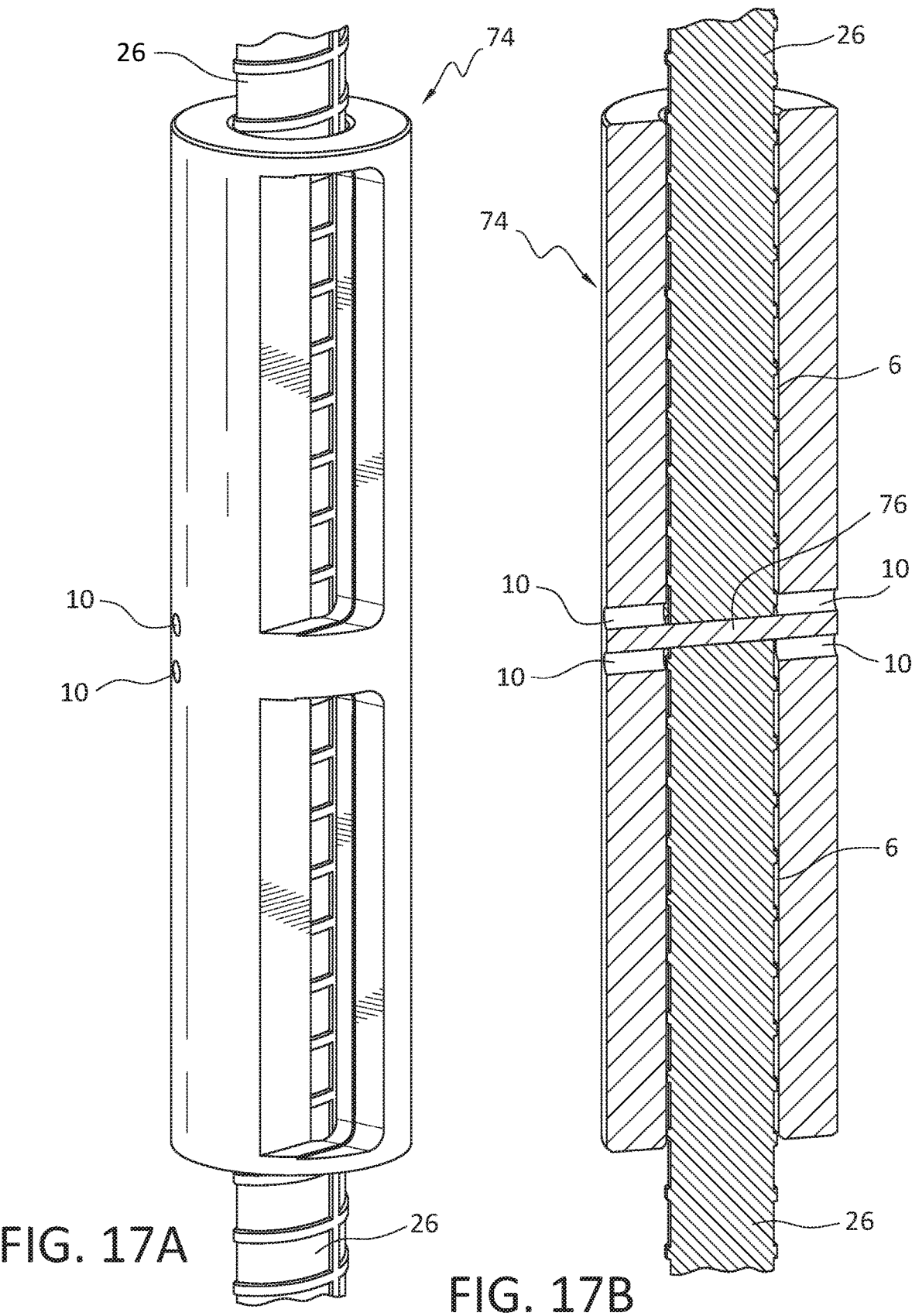
FIG. 17A is a perspective view of another embodiment of the coupler of FIG. 16A, showing two separate holes for the rebars.
FIG. 17B is an axial cross-section of the coupler of FIG. 17A.

Referring to FIGS. 17A and 17B, the couple 72 is modified as coupler 74 by dividing the hole 6 is divided into two holes with an internal wall 76. Sight holes 10 are provided at the wall 76 to ensure that the ends rebars 26 are abutting the internal wall 76. The cutout 16 is divided into two cutouts for the respective rebars 26. Another cutout 16 may be provided diametrically opposite to the one shown in a similar manner as with the coupler 2 or provided with two additional cutouts 16 in same manner as with coupler 38.

Figure 18A:
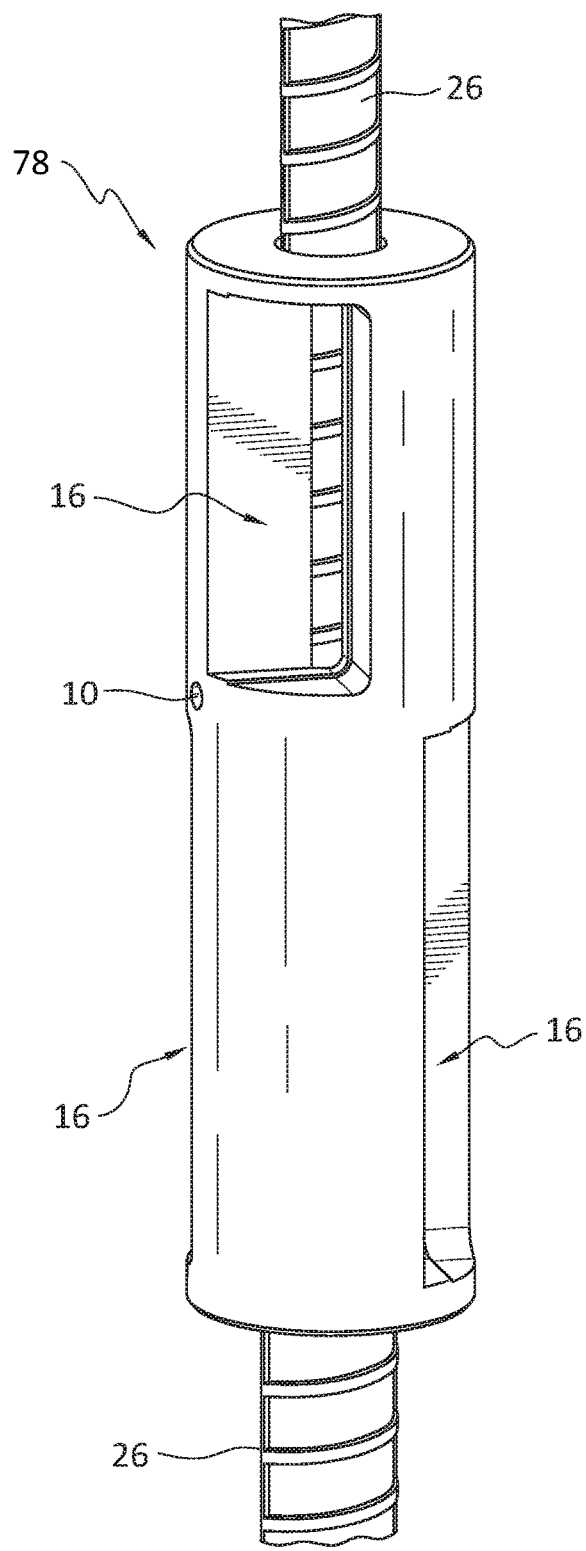
FIGS. 18A and 18B are perspective views of another embodiment of the coupler of FIG. 17A.
Figure 18B:
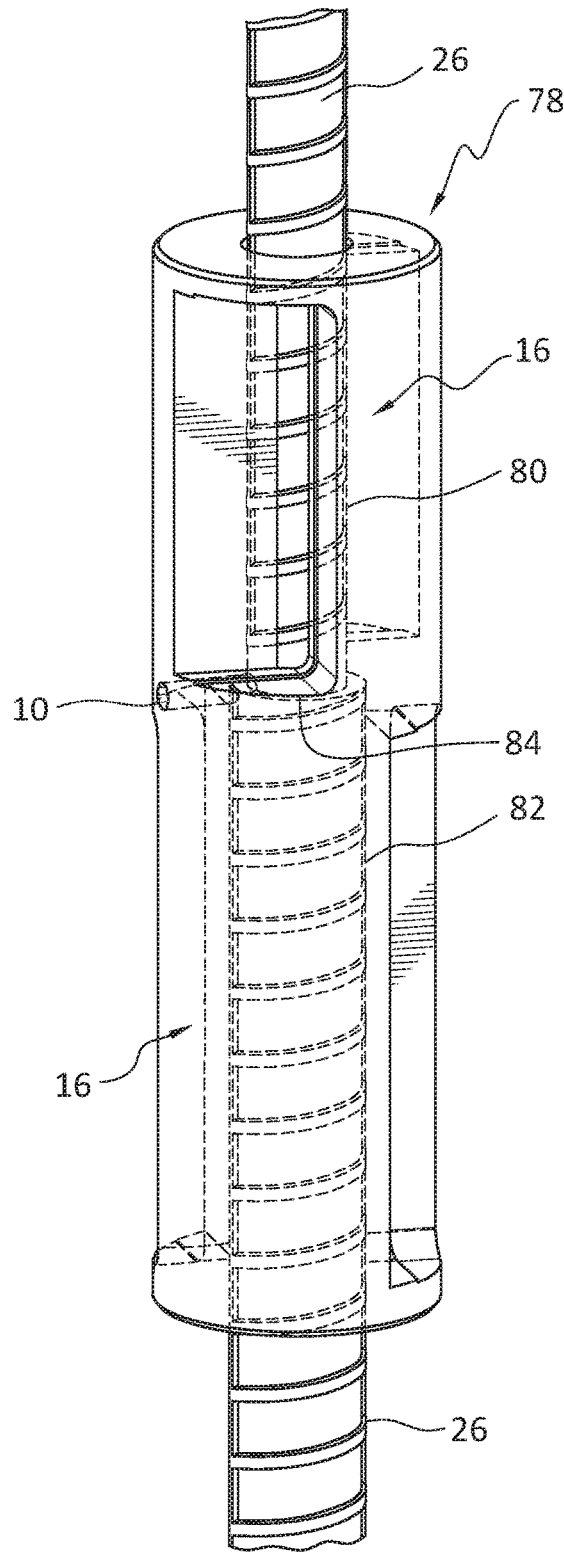

Referring to Figs. FIGS. 18A and 18B, the coupler 74 is modified as coupler 78 where two cutouts 16 are provided for each of the rebars 26 in the manner shown for the coupler 2. The upper cutouts 16 are opposite each other. The lower cutouts 16 are also opposite each other. The upper cutouts 16 are preferably offset 90° from the lower cutouts 16. The hole 6 may include a smaller diameter portion 80 and larger diameter portion 82 to accommodate a smaller diameter rebar and larger diameter rebar, respectively. The sight hole 10 is provided at the juncture of the openings 80 and 82 where the ends 84 of the rebars meet. The upper portion and the lower portion of the coupler 78 may also be provided with a single cutout 16, as shown with the coupler 44, or three cutouts 16 as shown with the coupler 38. The cutouts 16 in the upper portion of the coupler 78 are preferably circumferentially offset from the cutouts 16 in the lower portion of the coupler so that the cutouts 16 in the upper and lower portions of the coupler do not line up.

The various features disclosed herein with particular embodiments of the coupler should be understood to be not limited to the particular combination shown but may be used in combination with or in lieu of the other features shown in the other embodiments of the coupler. For example, the recesses 46 and the location of the sight hole 10 in the coupler 44 may also be used in the other embodiments of the coupler. Also, the multiple diameter hole 52 may also be used with the other embodiments of the coupler incorporating a threaded hole. Where the coupler is shown with two cutouts, a single cutout or more are also applicable.

With the use of the coupler 2 and the several embodiments disclosed herein, rebars may be used in combination with threaded rods for hold down systems. For example, a short bent rebar welded to the coupler may be used as an anchor embedded in a concrete foundation and connected to a threaded tie rod using the coupler 2. The threaded tie rod is attached to the stud wall using well known techniques as disclosed in the patents listed above in the Background of the Invention section. The coupler may also be used for joining one rebar to another rebar, with the same or different diameters. Multiple couplers may be used to connect a rebar at each end to a threaded rod.

While this invention has been described as having preferred design, it is understood that it is capable of further modifications, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A coupler, comprising:
   a) a single body having a first end and a second end;
   b) the single body including a first hole extending from the first end and a second hole extending from the second end, the first hole including a side wall, the first hole for receiving an end portion of a first rod and the second hole for receiving an end portion of a second rod;
   c) the single body including a longitudinal first cutout extending into the side wall to expose the end portion of the first rod to be welded to the single body, the single body being single before the first rod to be welded is inserted into the first hole; and
   d) the first cutout including a longitudinal first side wall surface and a longitudinal second side wall surface, the first side wall surface being transverse to the second side wall surface.

2. The coupler as in claim 1, wherein the first side wall surface includes a guide for a thickness of a welding bead to be deposited on the single body.

3. The coupler as in claim 2, wherein the guide includes a shoulder disposed longitudinally on the first side wall surface.

4. The coupler as in claim 2, wherein the guide includes a plurality of recesses disposed in the first side wall surface.

5. The coupler as in claim 4, wherein the recesses are disposed radially in the first side wall surface.

6. The coupler as in claim 2, wherein the guide comprises a straight line disposed on the first side wall surface at a radial distance from the first hole.

7. The coupler as in claim 6, wherein the straight line comprises a scored straight line on the first side wall surface.

8. The coupler as in claim 6, wherein the straight line comprises a shoulder on the first side wall surface.

9. The coupler as in claim 1, wherein the first side wall surface is perpendicular to the second side wall surface.

10. The coupler as in claim 1, wherein:
    a) the first cutout extends into the first end; and
    b) the first cutout is U-shaped.

11. The coupler as in claim 1, wherein the second hole communicates with the first hole and a sight hole is disposed at a junction of the first hole and the second hole.

12. The coupler as in claim 1, wherein the second hole includes multiple diameters.

13. The coupler as in claim 1, wherein the single body includes a second longitudinal cutout extending into the side wall to expose the end portion of the first rod to be welded to the single body.

14. The coupler as in claim 13, wherein the first cutout is opposite the second cutout.

15. The coupler as in claim 1, wherein the second hole is threaded.

16. The coupler as in claim 1, wherein the second end includes a third hole.

17. The coupler as in claim 1, wherein the second hole is off-center from the first hole.

18. The coupler as in claim 1, wherein the first hole is coaxial with the second hole.

19. The coupler as in claim 1, wherein the second hole is axially disposed into the side wall.

20. The coupler as in claim 1, wherein:
    a) the first hole and the second hole are coaxial; and
    b) the first cutout is configured for exposing the end portion of the second rod to be welded to the single body.

21. The coupler as in claim 1, wherein:
    a) the second hole is coaxial with the first hole, the second hole including a second side wall; and
    b) the single body includes a longitudinal second cutout extending into the second side wall for exposing the end portion of the second rod to be welded to the single body.

22. The coupler as in claim 1, wherein the first hole extends past the first cutout.

23. The coupler as in claim 1, wherein the first hole is larger in diameter than the second hole.

24. The coupler as in claim 1, wherein the single body includes a cylindrical body.

* * * * *